(12) United States Patent
Jupin et al.

(10) Patent No.: US 8,291,247 B1
(45) Date of Patent: Oct. 16, 2012

(54) METHOD AND SYSTEM FOR PREDICTING USE OF AN EXTERNAL DEVICE AND REMOVING THE EXTERNAL DEVICE FROM A LOW POWER MODE

(75) Inventors: Brian D. Jupin, Germantown, MD (US); Sean S. Lee, Rockville, MD (US); Jorge H. Guzman, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 537 days.

(21) Appl. No.: 12/241,466

(22) Filed: Sep. 30, 2008

(51) Int. Cl.
*G06F 1/00* (2006.01)
*H04N 5/14* (2006.01)
*H04N 5/63* (2006.01)

(52) U.S. Cl. ........ 713/323; 713/300; 713/320; 713/324; 348/705; 348/706; 348/730; 348/731; 455/348

(58) Field of Classification Search ............... 713/300, 713/320, 323, 324; 348/705, 706, 730, 731; 455/343.1
See application file for complete search history.

(56) References Cited

U.S. PATENT DOCUMENTS

| | | | |
|---|---|---|---|
| 5,285,284 A | 2/1994 | Takashima et al. | |
| 5,592,234 A | 1/1997 | Gardner et al. | |
| 5,598,222 A | 1/1997 | Lane | |
| 5,638,112 A | 6/1997 | Bestler et al. | |
| 5,801,785 A | 9/1998 | Crump et al. | |
| 5,999,741 A | 12/1999 | May et al. | |
| 6,023,585 A | 2/2000 | Perlman et al. | |
| 6,081,830 A * | 6/2000 | Schindler | 709/204 |
| 6,133,910 A | 10/2000 | Stinebruner | |
| 6,208,388 B1 | 3/2001 | Farleigh | |
| 6,263,503 B1 | 7/2001 | Margulis | |
| 6,397,385 B1 | 5/2002 | Kravitz | |
| 6,654,595 B1 | 11/2003 | Dexter | |
| 6,704,060 B2 | 3/2004 | Levandowski | |
| 6,757,909 B1 | 6/2004 | Maruo et al. | |
| 6,885,974 B2 | 4/2005 | Holle | |
| 7,024,256 B2 * | 4/2006 | Krzyzanowski et al. | 700/65 |
| 7,145,609 B2 | 12/2006 | Kim | |
| 7,380,264 B2 * | 5/2008 | Potrebic | 725/74 |
| 7,437,577 B2 * | 10/2008 | Obara et al. | 713/300 |
| 7,437,578 B2 * | 10/2008 | Menzl | 713/300 |
| 7,478,180 B1 | 1/2009 | Li | |
| 7,538,826 B2 * | 5/2009 | Englert | 348/730 |
| 7,617,515 B1 | 11/2009 | Laksono | |
| 7,644,292 B2 * | 1/2010 | Kimura | 713/323 |
| 7,660,938 B1 | 2/2010 | Chow et al. | |
| 7,793,317 B2 * | 9/2010 | Sullivan et al. | 725/14 |
| 7,797,555 B2 * | 9/2010 | Zmudzinski et al. | 713/300 |
| 7,827,426 B2 * | 11/2010 | Burnett et al. | 713/323 |
| 7,831,988 B2 * | 11/2010 | Ishida | 725/46 |
| 7,930,446 B2 | 4/2011 | Kesselman et al. | |

(Continued)

OTHER PUBLICATIONS

"DIRECTV AM21 Off-Air Tuner"—2 pages, Dated 2008.*

(Continued)

*Primary Examiner* — Brian Misiura

(57) ABSTRACT

A system and method for removing a portion of a system such as an external device from lower power mode includes a host device and an external device in communication with the host device. The external device is in a low power mode. The host device includes a controller generating a prediction signal in response to an input to an external device and commands the external device from low power mode in response to the prediction signal.

21 Claims, 23 Drawing Sheets

U.S. PATENT DOCUMENTS

| | | | |
|---|---|---|---|
| 7,937,598 B2 * | 5/2011 | Yeh et al. | 713/300 |
| 2004/0103278 A1 | 5/2004 | Abhishek et al. | |
| 2004/0153263 A1 * | 8/2004 | Holle | 702/60 |
| 2004/0177380 A1 | 9/2004 | Hamel et al. | |
| 2004/0187152 A1 * | 9/2004 | Francis et al. | 725/58 |
| 2004/0260823 A1 | 12/2004 | Tiwari et al. | |
| 2005/0034154 A1 | 2/2005 | Yeh et al. | |
| 2005/0246735 A1 | 11/2005 | Dabrowa | |
| 2006/0029371 A1 | 2/2006 | Tanaka | |
| 2006/0036717 A1 | 2/2006 | Backman et al. | |
| 2006/0139147 A1 | 6/2006 | Sterzinger et al. | |
| 2007/0019115 A1 * | 1/2007 | Umeda | 348/730 |
| 2007/0082639 A1 | 4/2007 | Lindstrom et al. | |
| 2007/0110393 A1 | 5/2007 | Jang | |
| 2007/0117506 A1 | 5/2007 | Park et al. | |
| 2007/0146551 A1 * | 6/2007 | O'Neil | 348/731 |
| 2007/0149163 A1 * | 6/2007 | Yasuta | 455/348 |
| 2007/0180485 A1 | 8/2007 | Dua | |
| 2007/0268362 A1 | 11/2007 | West et al. | |
| 2008/0104636 A1 | 5/2008 | Tanaka | |
| 2008/0127277 A1 * | 5/2008 | Kuschak | 725/74 |
| 2008/0162925 A1 | 7/2008 | Okaya | |
| 2008/0216100 A1 | 9/2008 | Li et al. | |
| 2008/0270814 A1 * | 10/2008 | Starr et al. | 713/323 |
| 2009/0172431 A1 | 7/2009 | Gupta et al. | |
| 2009/0199256 A1 | 8/2009 | White et al. | |
| 2009/0249057 A1 | 10/2009 | Lerner et al. | |
| 2009/0303394 A1 | 12/2009 | Poo et al. | |
| 2009/0320055 A1 * | 12/2009 | Langille et al. | 725/14 |
| 2010/0225813 A1 * | 9/2010 | Hirono et al. | 348/554 |
| 2010/0302456 A1 * | 12/2010 | Testin et al. | 348/706 |
| 2010/0333086 A1 | 12/2010 | Prabu et al. | |

OTHER PUBLICATIONS

DIRECTV—"AM21 Off Air Tuner User Guide"—10 pages, Dated 2010.*

Non-final Office action dated Mar. 2, 2012 in U.S. Appl. No. 12/241,354, filed Sep. 30, 2008 by Sean S. Lee et al.

Sanchez, Julio; Canton, Maria P.; "Microcontroller Programming"; 2006; CRC Press; 1st edition; Chapter 7; pp. 134-136.

Final Rejection dated Jul. 20, 2012 in U.S. Appl. No. 12/241,354 filed Sep. 30, 2008 by Sean S. Lee et al.

* cited by examiner

METHOD AND SYSTEM FOR PREDICTING USE OF AN EXTERNAL DEVICE AND REMOVING THE EXTERNAL DEVICE FROM A LOW POWER MODE

TECHNICAL FIELD

The present disclosure relates generally to an external device in communication with a host device and, more specifically, to a method and system for removing the external device from a low power mode.

BACKGROUND

The statements in this section merely provide background information related to the present disclosure and may not constitute prior art.

Satellite television has become increasingly popular due to the wide variety of choices available on a national level. Satellite television systems use a set top box or other type of satellite receiver for receiving and displaying satellite broadcasted material. In recent years, the satellites are used to broadcast local channels by way of a spot beam to users in various markets. Local channels typically have a primary channel with sub-channels. Sub-channels that are broadcasted in the local markets typically are not carried by the satellite provider. The lack of sub-channels in the satellite system may be due to many factors including each of customer interest, and business and regulatory challenges.

Some content users may desire access to the local sub-channels. In some cases, news and local weather may be carried on the local sub-channels. Some users may desire access to such information.

Satellite provider DIRECTV® in previous versions of set top boxes provided one or two over-the-air tuners so that local content may be received over-the-air in addition to the satellite content. The entertainment business, including the satellite television business, is increasingly competitive. While a number of satellite customers desire local content that is not provided through the satellite, more and more customers find it sufficient to receive only the local content provided through the satellite.

SUMMARY

The present disclosure provides a system for an external device to be removed from a low power mode as controlled by a receiving device. If tuners are in both the receiving device and in an external tuner, either a tuner in the receiving device or in the external device may be removed from a low power mode. This may be performed for the lowest power tuner first. This may be done predictively.

In one aspect of the disclosure, a method includes coupling an external device to a host device, entering a low power mode at an external device, generating a prediction signal in response to inputs to an external device, removing the external device from low power mode in response to the prediction signal.

In a further aspect of the disclosure, a system includes a host device and an external device in communication with the host device. The external device is in a low power mode. The host device includes a controller generating a prediction signal in response to an input to an external device and commands the external device from low power mode in response to the prediction signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
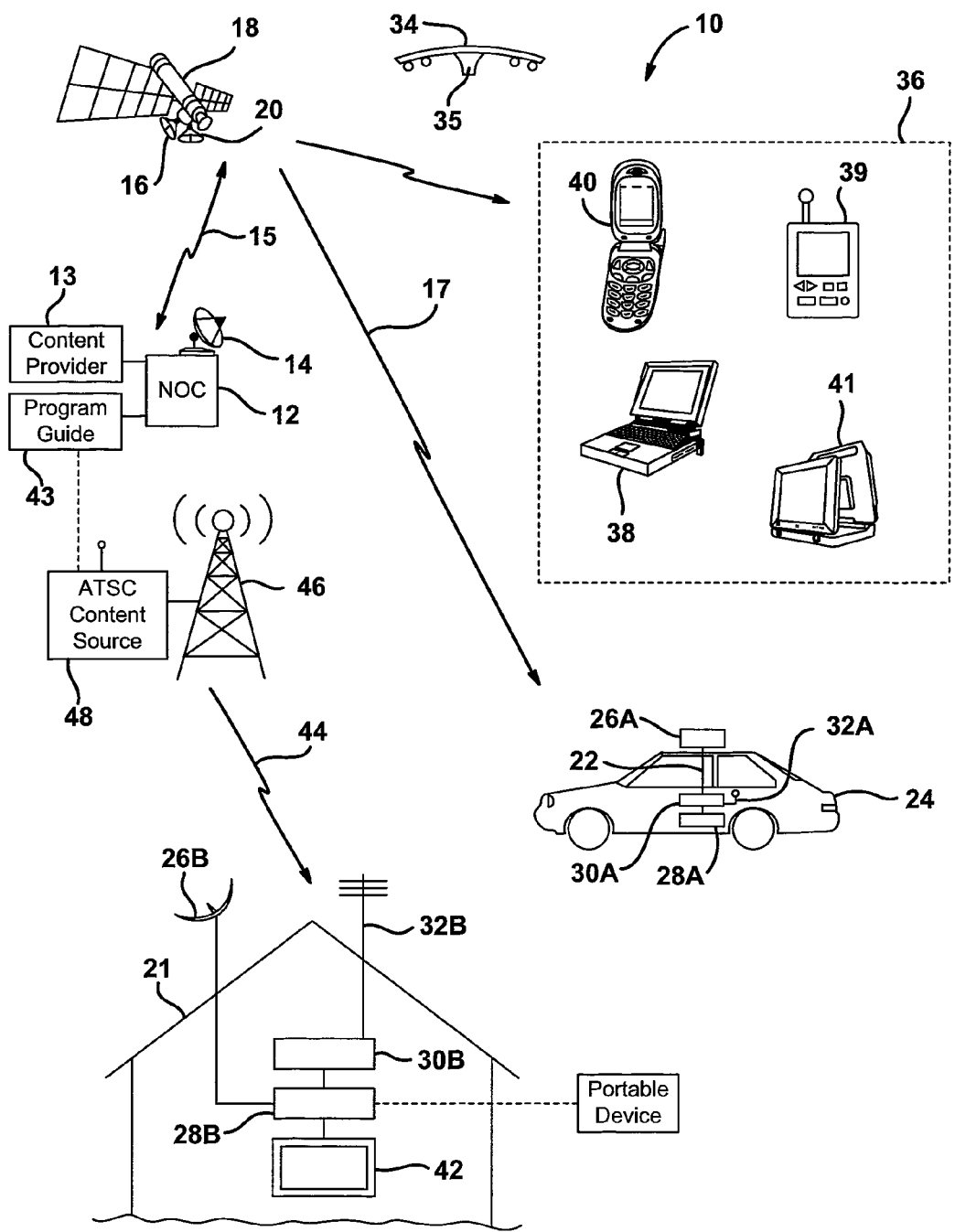
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDS) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcasting system 10 is set forth in the following example. The satellite television broadcasting system 10 includes a network operations center (NOC) 12 in communication with various content providers 13. The NOC 12 may also be referred to as a head end. Various programming content may be provided from the content providers 13 including movies, sporting events and the like. The content providers 13 may provide live feeds as well as recorded material. The content providers may thus provide signals or media.

The network operations center 12 generates wireless communication signals 15 through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, live content, traffic, weather, hazardous material warning areas or advertising marketing. The wireless signals 15 may be referred to as uplink signals. The wireless signals may also have various video and audio information associated therewith.

Wireless communication signals 17 such as downlink signals may be generated from the satellite 18. The downlink signal corresponds in content to the uplink signals.

A transmitting antenna 20 of the satellite 18 communicates the downlink signals 17 to various receiving systems including stationary systems such as those in a home 21 as well as mobile receiving systems 22.

The mobile receiving system 22 is disposed within an automotive vehicle 24. Several mobile systems 22 may be incorporated into a network. The mobile receiving system 22 includes a receiving antenna 26A that receives the wireless signals 17 from the satellite 18 and processes the signals in a receiving unit 28A. The mobile receiving unit 28 will be further described below. The receiving unit 28A may be in communication with external devices 30 such as an over-the-air receiving unit in communication with an over-the-air antenna 32. More than one external device may be in communication with the set top box.

The satellites 18 may also be replaced with another high altitude device such as a stratospheric platform 34 for transmitting content to the mobile device, transmitting communication signals, transmitting lost content segments and transmitting location-specific signals. Stratospheric platforms 34 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 34 may also include a receiving unit 35 that is used to receive signals from the satellite 18. The receiving unit 35 may be referred to as a stationary unit since, although it moves, the stratospheric platform maintains a particular position above the earth. The receiving unit 35 may be used to transfer content segments or packets to another node of the device.

The present invention may also be used for displaying and communicating various wireless communication signals on a personal mobile device 36 such as a laptop computer 38, a personal digital assistant 39, a cellular telephone 40 and the portable satellite receiver 41 such as the SAT-GO® system provided by DIRECTV®.

The home 21 may include a host device such as a user receiving unit 28B that communicates with the satellite through the antenna 26B. The receiving unit 28B may also be in communication with a display 42 such as a television.

A program guide system 43 may provide content guide information to the network operation center 12. The program guide system 43 organizes data available regarding the programming channels and organizes them for ultimate transmission to the receiving devices including 28A-B and 35. The receiving devices may receive the program guide data and display a grid guide in response thereto. The program guide data may be referred to as program objects. The program object may also include identifiers for the type of program (movie, sports, series), a series or short identifier and an episode number for a series. As will be further described below, a content identifier, a Tribune Media Services® ID, a program information packet or another identifier may be used as an identifier for a particular program. These may be found in the data corresponding to the program guide system 43. The same or equivalent program or event may have the same or similar packet identifier, program-associated data, Tribune Media Services® ID or content identifier.

As mentioned above, the present disclosure also is used for receiving over-the-air content 44 from an antenna 46. The content may be broadcast over the air in an Advanced Television System Committee (ATSC) content format from an ATSC content source 48. Of course, the content may also be in other formats, such as NTSC format, ISDB-T and DVB-T/DVB-T2/DVB-H. The ATSC content 44 is local content that is communicated to the antenna 32A, 32B associated with respective tuner modules or external devices. In one embodiment, the tuner modules 30A, 30B include two ATSC tuners that are in communication with the receiving units 28A, 28B. The receiving units may also be referred to as a host unit and the tuner units may also be referred to as an external device since they are external to the receiving units 28. As will be described below, a universal serial bus (USB) may be used to communicate between the tuner units 30 and the receiving units 28.

ATSC content source 48 may communicate guide information to the program guide 43 which is ultimately communicated to the users, receiving or host devices. Various methods may be used to transmit the guide data from the source 48 including email or other types of communications.

Figure 2:
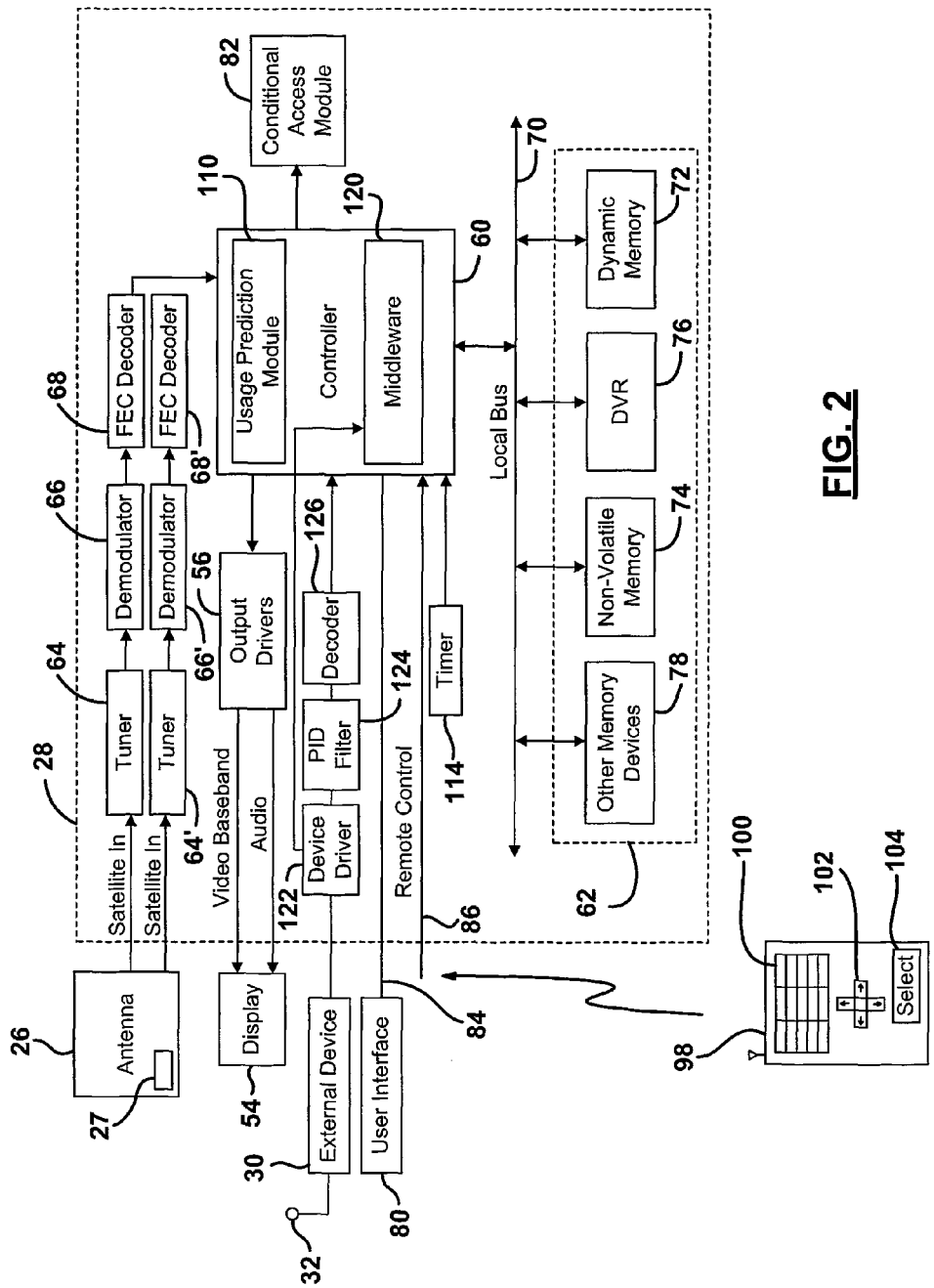
FIG. 2 is a detailed block diagrammatic view of a receiving unit of FIG. 1.

Referring now to FIG. 2, the receiving units 28A, B described above are collectively referred to as receiving unit 28 and is illustrated in further detail. The receiving units may also be generally configured in a similar manner. The receiving units 28 may also be referred to as receiving devices, user devices or host devices since they can host an external device. Antenna 26 may be various types of antennas including a rotating antenna which is used to track the relative movement of the satellite or other transponding device with respect to a vehicle. The antenna 26 may be a single antenna used for satellite television reception. The antenna 26 may also be an electronic antenna. The antenna 26 may include an internal controller 27 that controls the operation of the antenna 26, which is suitable for a moving or rotatable antenna. The antenna 32 used for receiving over-the air signals may be physically combined with antenna 26.

The receiving unit 28 includes a display 54 associated therewith. The display 54 may be incorporated into the unit 28 or may be external to the receiving unit 28 such as part of a vehicle 24 or television. The display 54 may have output drivers 56 used for generating the desired audio and video outputs suitable for the particular display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

The controller 60 may control various functions including activating the external devices, controlling communication between the host and external device, controlling a low-power mode, and controlling a program interface (both adding and removing content).

It should be noted that more than one tuner 64, demodulator 66 and forward error correction decoder 68 may be provided in the system. In this example, a second tuner 64', a second demodulator 66' and a second forward error correction decoder 68' may be provided in the receiving unit 28. Of course, various numbers of tuners may be incorporated into a receiving unit 28.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten.

A digital video recorder (DVR) 76 may also be coupled to the local bus 70. The digital video recorder 76 may be within the receiving device 28 or coupled to the receiving device. The digital video recorder 76 may be used to store programming content or sub-contents. The DVR 76 may also be used to store program guide data or programming metadata.

Other memory devices 78 may also be coupled to local bus 70. The other memory devices may include other types of dynamic memory or non-volatile memory. The display 54 may be changed under the control of controller 60 in response to the data in the dynamic memory 72 or non-volatile memory 74. Part of the memory 62 may be used as a buffer.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 80 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the receiving unit.

A conditional access module 82 (CAM) may also be incorporated into the receiving unit. The access module 82 may include software to allow the receiving unit 28 access to various channels and wireless signals generated by the system. Not having an access card or not having an up-to-date access card 82 may prevent the user from receiving or displaying various wireless content from the system.

One user interface is a remote control device 98 having a key pad 100, an arrow key pad 102, and a select button 104 may also be provided. Inputs to the receiver 28 may be provided by the remote control device 98 or through another type of user interface 80. The remote control device 98 may be used in addition to or instead of user interface 80.

The controller 60 may include a usage prediction module 110. The usage prediction module 110 may generate a usage prediction signal that corresponds to whether or not the tuners or the ATSC external tuner may be used. As will be set forth below, the usage prediction signal may be formed with various inputs, including inputs from the remote control 98, a timer 114, or the like. The timer 114 that is included within the receiving unit may also be used to generate a time at which the receiving unit is typically powered on, or may predict a time just before a recording event may start. The usage prediction module 110 and its corresponding signal may thus be used to remove a component from a low-power mode. For example, if the external device is an ATSC tuner, one or both of the tuners may be removed from a low-power mode based upon the usage prediction signal from the usage prediction module 110.

The controller 60 may also include middleware 120 that may be used for interfacing with a device driver 122, a packet identifier (PID) filter 124 and a decoder 126. The device driver 122, the PID filter 124 and the decoder 126 may be used for interfacing with the external device 30. As will be described below, the device driver 122 may be a universal serial bus driver. The middleware 120 is used for controlling the tuners 64 and other functions of the receiving unit 28 as well as interfacing with an external device 30 should the receiving unit 28 be coupled thereto. Further details of the operation of the middleware 120, the receiving unit 28 and the external device 30 will be further described below.

Figure 3:
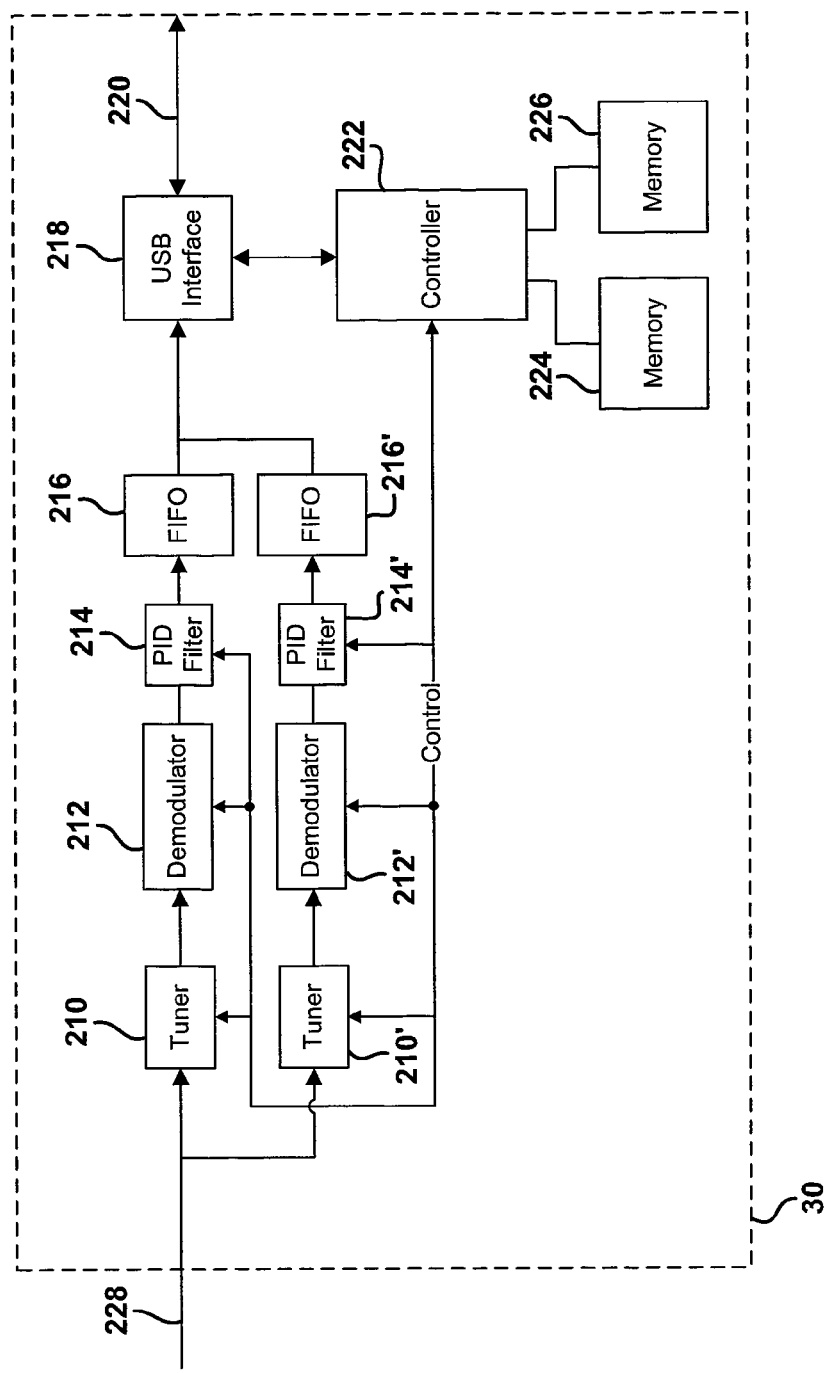
FIG. 3 is a detailed block diagrammatic view of a dual-tuner external device of FIG. 1.

Referring now to FIG. 3, an external device 30 is illustrated in a high-level block diagrammatic view in further details. In this example, the device includes a dual tuner device that includes a first tuner 210 and a second tuner 210'. The tuners may be ATSC tuners. Of course, other tuners such as QAM or NTSC may be used. Both tuners may be operable at the same time. The external device 30 may also include a demodulator 212 and 212'. A PID filter 214 and 214' may also be included. The demodulators 212, 212' are used to demodulate the tune signals and the PID filter 214 may be used to filter the signals based on a program identifier. A first-in, first-out (FIFO) buffer 216, 216' may be included in each receiving chain. A USB interface 218 may be in communication with the FIFO buffers 216, 216'. The USB interface may be in communication with a USB connector 220. Another type of interface may be used including other wired interfaces, a wireless interface, a network interface including an Internet connection or Ethernet connection. The wireless connection may be a Bluetooth® connection.

A controller 222 may be used to control the various settings and operation of the tuners 210, 210', the demodulators 212, 212', the PID filters 214, 214', the FIFO buffers 216, 216' and the USB interface 218. As will be set forth below, the controller may change various settings in response to an upgrade.

The controller 222 may also be in communication with a first memory 224 and a second memory 226. The memories 224, 226 may hold executable code for configuring the controller, the demodulator, and/or the tuner. The communications protocol firmware may also be included within the memory. The memory may be various types of memory devices including an EEPROM. The EEPROM is used to store the microprocessor controller 222 firmware. One of the memories 224, 226 may be used for executing the microprocessor firmware.

The external device 30 may also include an RF port 228 used for communicating with an antenna such as antenna 32 illustrated in FIG. 2.

Figure 4:
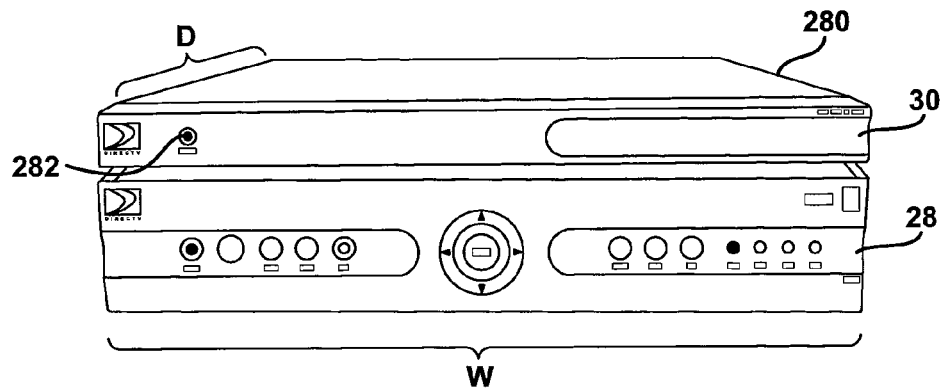
FIG. 4 is a front perspective view of an external device on top of a host device.

Referring now to FIG. 4, a receiving device 28 is illustrated having the external device 30 placed thereon. As can be seen, the external device 30 may have a housing 280 that has the same width or about the same width as the receiving unit 28. The depth of the external device 30 and the receiving unit 28 or host device may also be the same or similar. Such a configuration will allow the external device 30 to be placed above or below the receiving unit 28. The external device 30 may include a light-emitting diode indicator 282 on the front panel thereon. The light-emitting diode indicator 282 may provide an indication that power has been provided to the external unit 30. The indicator 282 may also provide an indication by flashing on and off states to communicate another status to a user.

Figure 5:
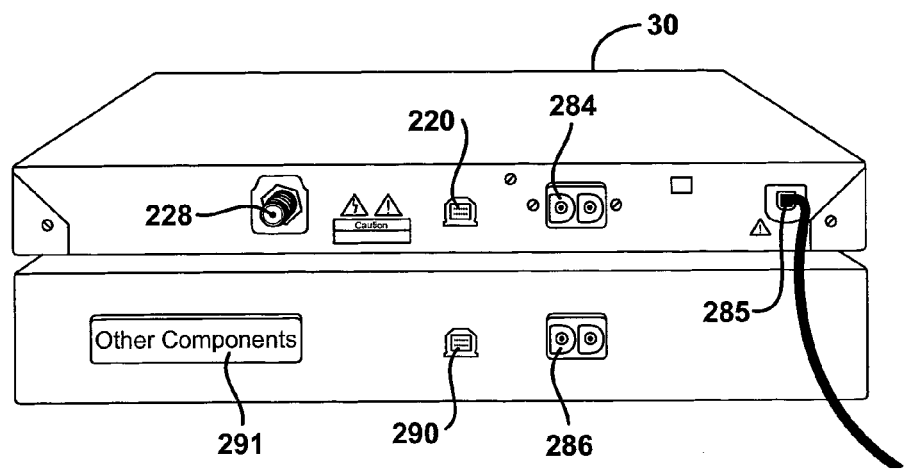
FIG. 5 is a rear perspective view of the external device.

Referring now to FIG. 5, a partial rear view of the external device 30 above the host device 28 is illustrated. The RF antenna input 228 is illustrated together with the USB connector 220. An electrical AC power input 284 may also be provided. An AC power output 285 may also be provided.

To connect the external device to the receiving or host unit 28, a USB port 290 on the back of the receiving unit 28 may be coupled to the USB connector 220. The power input cord used for the receiving unit 28 may be coupled to the power input 284. The power output cable 285 may be coupled to the receiving unit 28 electrical power input 286. In this manner, only one electrical cord needs to connect the receiving unit 28 and the external device 30 to an AC power source. Other connectors 291 may be located on the host device 28 for connections to other devices such as audio components, displays, etc.

Figure 6:
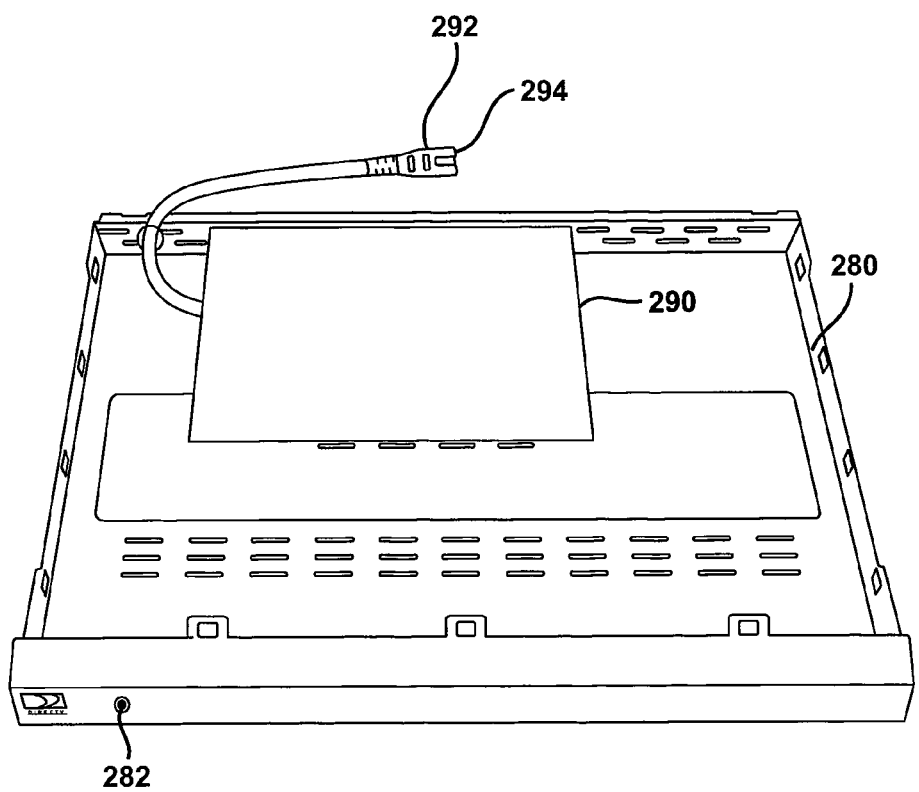
FIG. 6 is an internal perspective view of the external device.

Referring now to FIG. 6, should the external device 30 be a tuner, a tuner module 290 may be placed within the housing 280. The tuner module 290 may be a circuit board. As can be seen, the tuner module has an AC power output coupled to cord 292. The connector 294 of cord 292 is used for coupling directly to the receiver unit 28.

Figure 7:
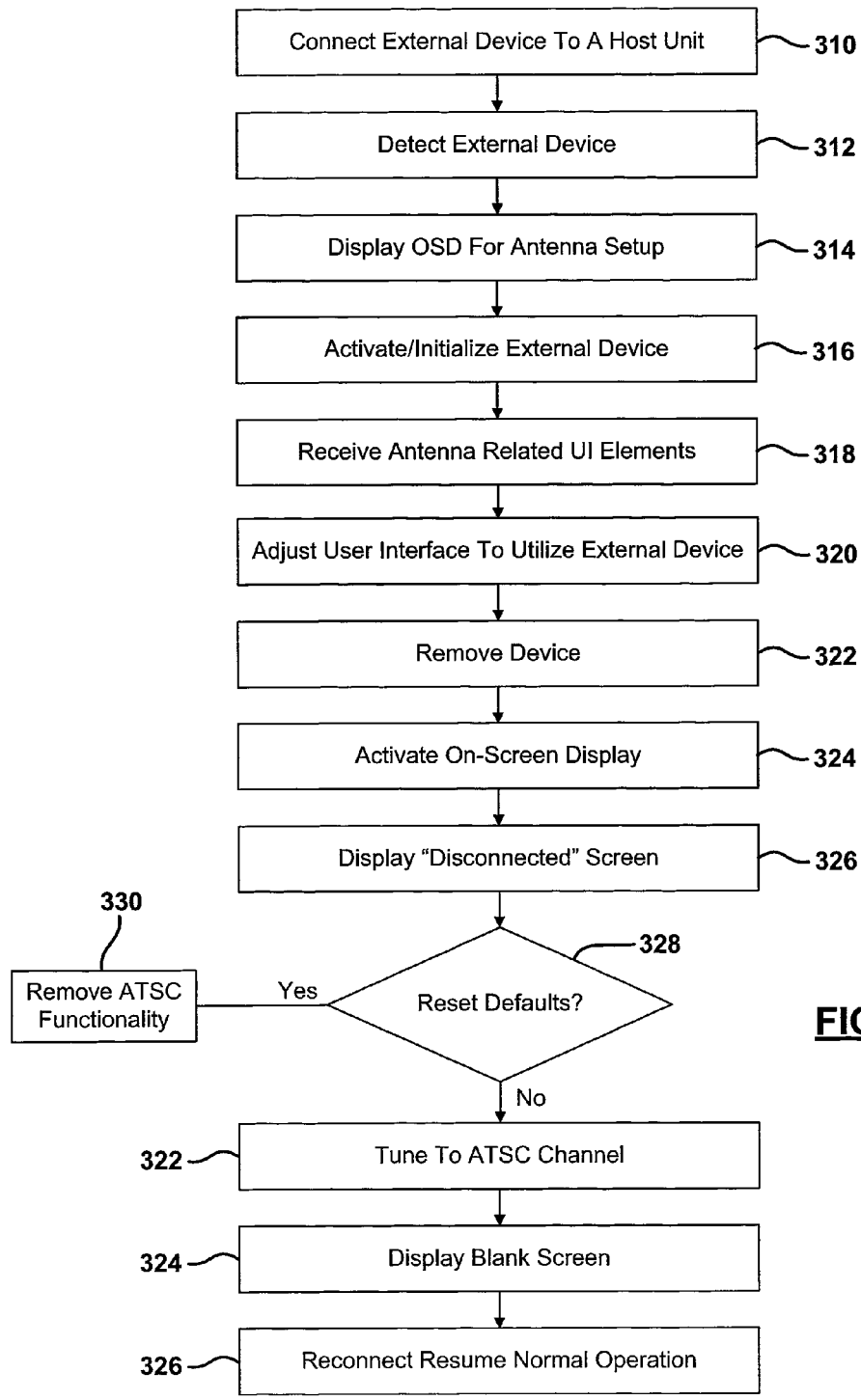
FIG. 7 is a flowchart of a method of coupling and decoupling an external device and a host device.

Referring now to FIG. 7, a method of connecting and disconnecting an external device to a host unit such as a receiver unit is illustrated. In step 310, the external device is connected to a host unit. The connection may be performed wirelessly or wired. The physical connection may be through a USB cable and associated connectors. In step 312, the external device is detected at the host unit. The detection may be performed automatically using the associated drivers and the like. Details of this will be described further below.

After step 312, step 314 displays an on-screen display (OSD) for an external device which in this example is for an antenna. In step 316, the external device is activated and initialized so that communication may take place between the external device and the host unit. After step 316, the on-screen display or program guide may receive various elements associated with the external device. In step 320, the elements are used to adjust the user interface to utilize the external device. In the case of an ATSC tuner, ATSC channels and sub-channels not available prior to the ATSC tuner being coupled to the device are available.

In step 322, the external device may be removed. In step 324, an on-screen display may be activated to display a "disconnected" screen as illustrated in step 326. In step 328, the default user interface may then be displayed so that the elements added corresponding to the external device are removed. Step 330 removes the ATSC functionality. If the defaults are not re-set in step 328, an ATSC channel may be tuned or attempted to be tuned in step 332. A blank screen may be displayed if the connection with the external device is not reestablished in step 334. In step 334, the ATSC channel may resume a normal connection should the device again be connected to the external tuner.

In this manner, external resources may be dynamically added to the system to take advantage of them immediately.

Figure 8A:
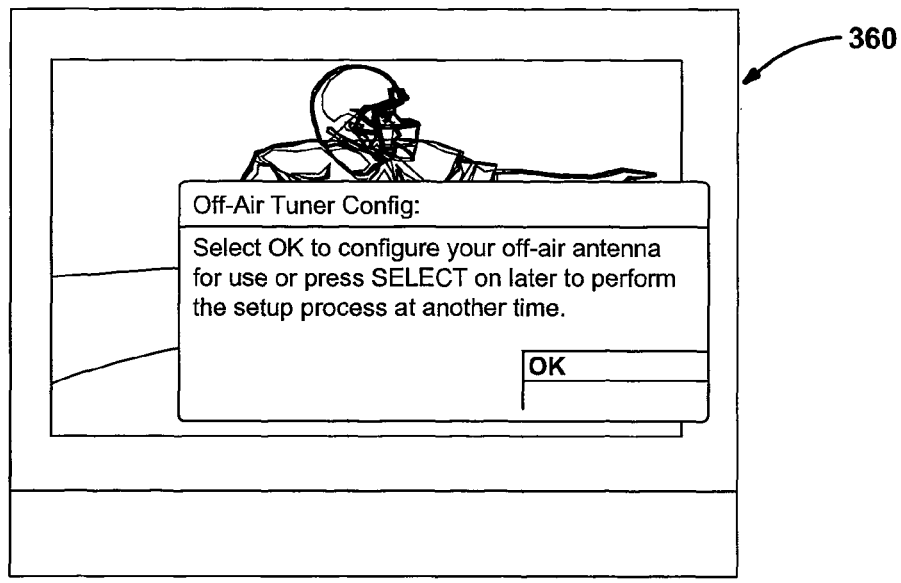
FIGS. 8A-8E are screen views of various user interfaces for connecting an external device to a host device.
Figure 8B:
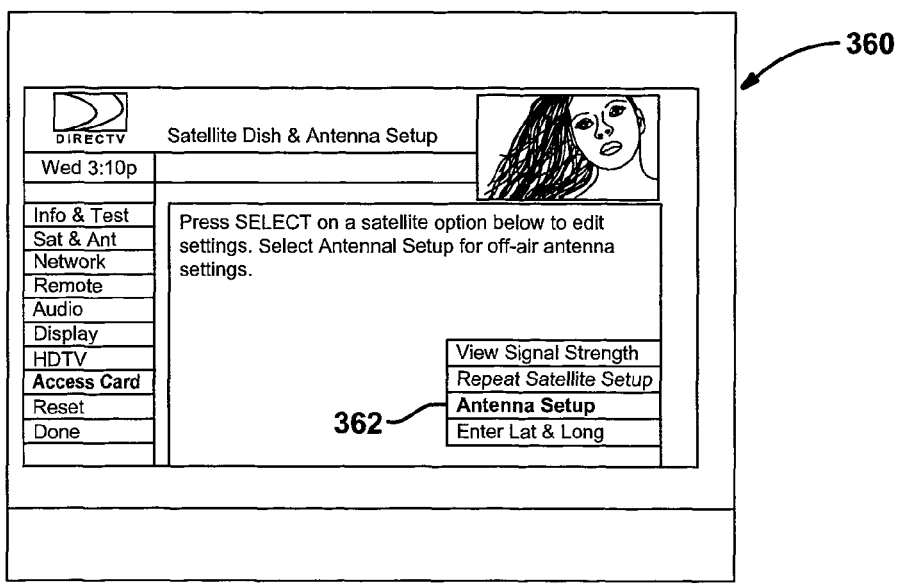
Figure 8C:
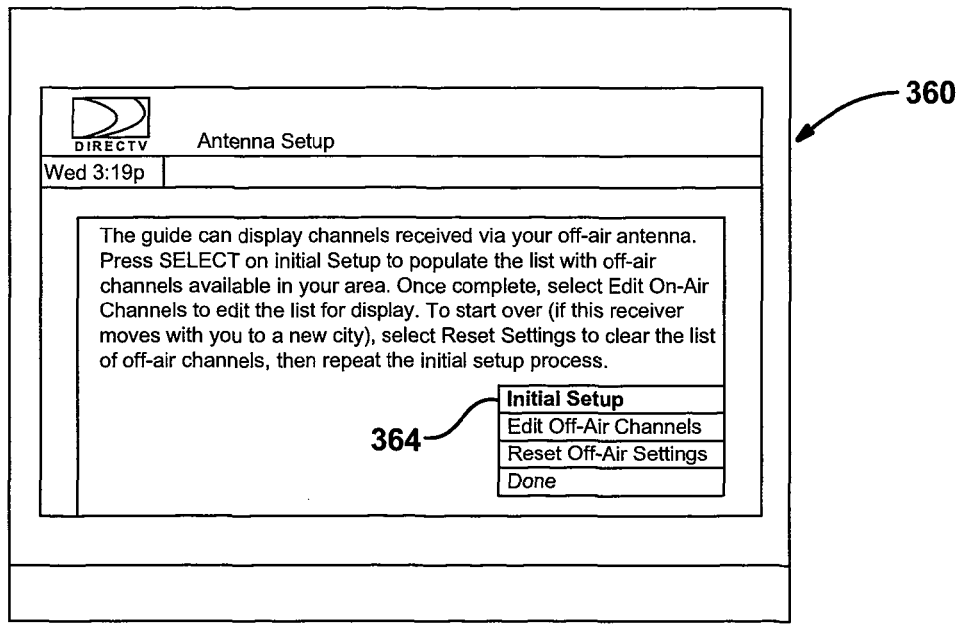
Figure 8D:
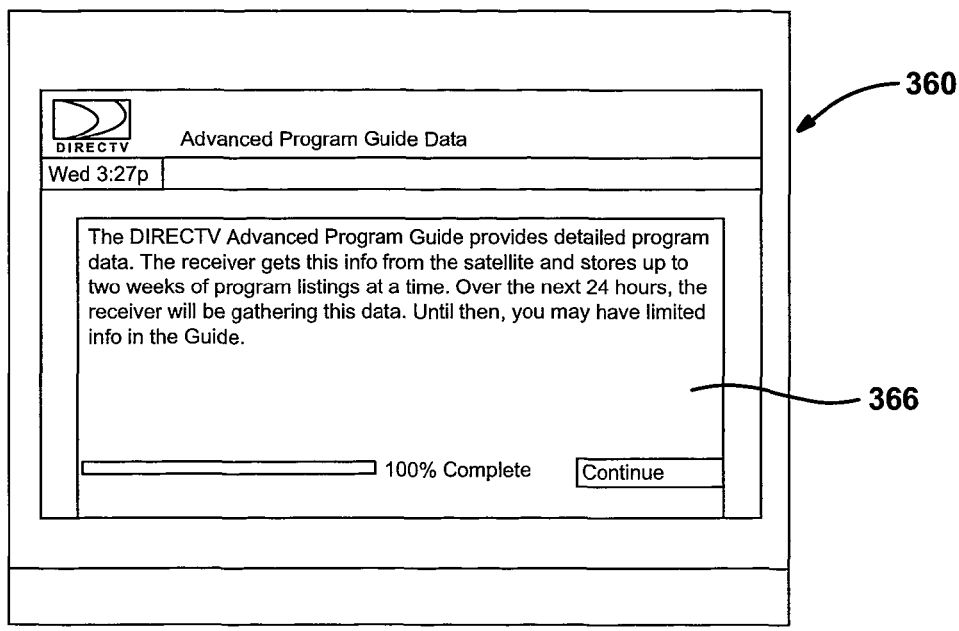

Referring now to FIGS. 8A-E, a user interface 360 for tuning an off-air or over-the-air tuner is set forth. Once the over-the-air tuner is connected to the host, such as the receiver unit, the user interface 360 querying whether the user desires to configure the tuner in FIG. 8A. In FIG. 8B, an antenna setup may be selected by selection box 362. An initial setup in box 364 illustrated in FIG. 8C may be selected. The user interface screen 366 displayed in FIG. 8D provides a statement that the receiver will gather data from the program guide. The receiver data is used to supplement the usual program guide with local content received over the air.

Figure 8E:
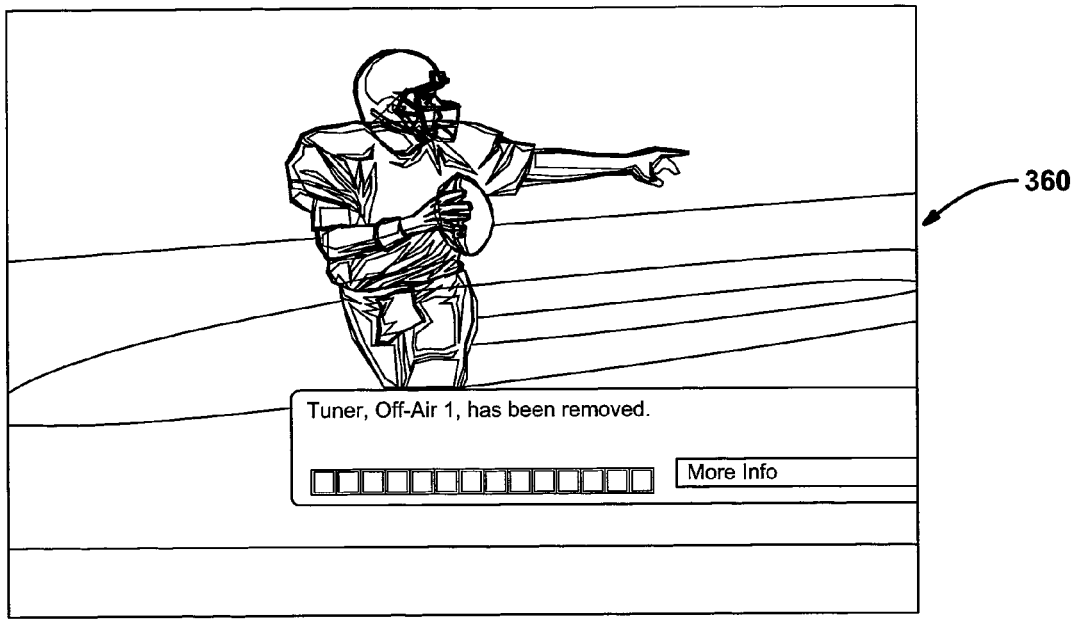

In FIG. 8E, the user interface 360 is displayed when the tuner has been removed from the system. Re-plugging in the tuner may automatically allow this screen to be removed.

Figure 9A:
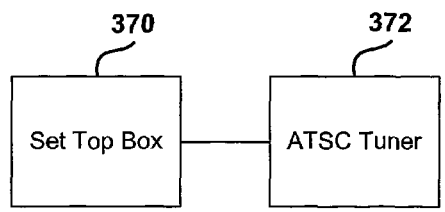
FIGS. 9A-9E are block diagrammatic views of different types of host devices coupled to different types of external devices.

Referring now to FIGS. 9A-9E, it should be noted that the external device may be something other than a tuner. Also, the host device may be various types of receivers or set top boxes. The methods set forth below may apply to the various devices set forth in FIGS. 9A-9E. In FIG. 9A, a set top box 370 is in communication with a high definition television tuner such as an Advanced Television System Committee (ATSC) tuner 372. The set top box corresponds to the receiving unit 28 and the ATSC tuner corresponds to the external device 30. The ATSC tuner may be a dual ATSC tuner as described above.

Figure 9B:
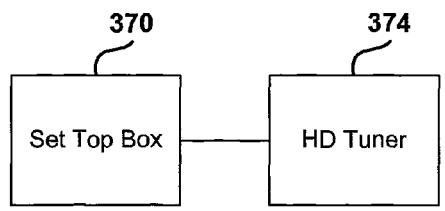

Referring now to FIG. 9B, the set top box 370 may also be in communication with a high definition tuner 374. One or more high-definition tuners within the HD tuner 374 may be in communication with the set top box 370. By providing an HD tuner 374, additional high definition programming may be provided to the set top box. As set top box and tuner technology change, the life of the set top box 370 may be extended by providing an additional HD tuner 374 that includes newer technology. The HD tuner 374 may be more energy-efficient or provide different functionality. The set top box 370 may be provided with no HD tuners and only additional HD tuners may be provided.

Figure 9C:
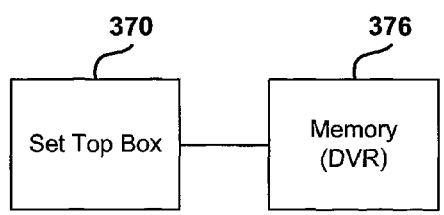

Referring now to FIG. 9C, set top box 370 is illustrated in communication with a digital video recorder or memory 376. A set top box 370 having no DVR capabilities may be provided DVR capability by providing an external digital video recording unit 376. Additionally, the memory or DVR 376 may be provided to a set top box 370 that does not include such functionality. Therefore, the expansion to the set top box may be provided.

Figure 9D:
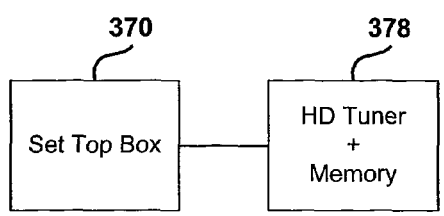

Referring now to FIG. 9D, the set top box 370 may be in communication with an HD tuner and a memory box 380. Both an HD tuner and a memory 380 may be used to extend the capabilities of the set top box 370. By providing an HD tuner, a standard definition set top box may be provided with HD functionality.

Figure 9E:
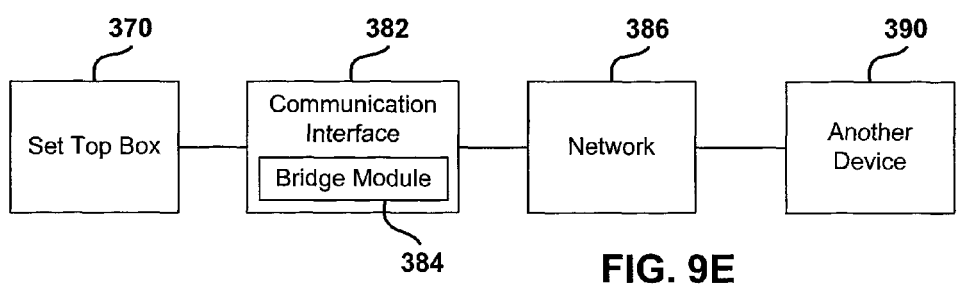

Referring now to FIG. 9E, the set top box 370 may be in communication with a communication interface 382. By providing the external resource as a communication interface 382, other devices may be communicated with. Encryption services, protocol translations, audio-visual transport translators may all be provided so that different devices that support different formats may be able to view DIRECTV® video. The set top box 370 may also view media from external sources. The media may be non-natively supported by the set top box 370. The communication interface 382 may convert the media format to a set top box supported format. The communication interface 382 has a bridge module 384 that is used to link the set top box 370 through a network 286 to another device 390. The other device 390 may also provide a back channel via the Internet to communicate conditional access information or retrieve programming from the network operation center or head end. It should be noted that the network 386 may be a wired network or a wireless network.

The connections between set top box 370 and the other devices 372-382 may be performed in various methods such as wired, wireless, Bluetooth®, RF, Optional or the like.

Figure 10:
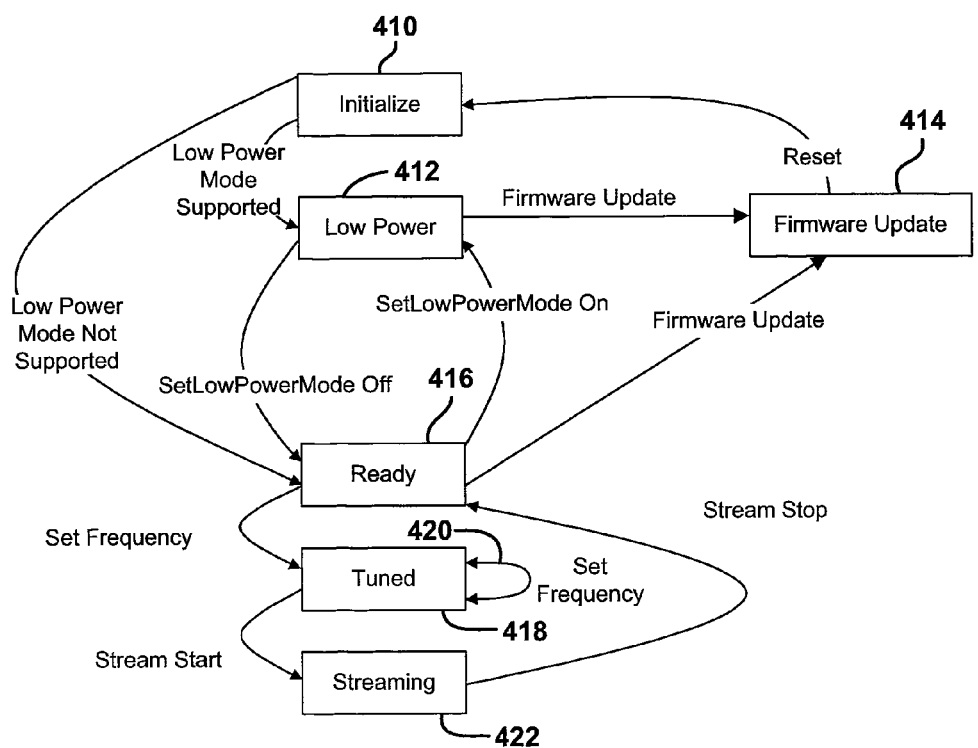
FIG. 10 is a state diagram of a method of operating an external device.

Referring now to FIG. 10, a state diagram of a host device or a receiver is illustrated. In box 410, the initialization state is set forth. The initialization state was described above in FIG. 7.

After the initialization state, a low-power state 412 may be entered if low power mode is supported by the system. A low-power state may be provided to have one or two tuners enter a low power mode should it be determined. From a low-power mode, a firmware update command may also be provided in box 414. The firmware update 414 may provide updates to the executable code within the external device. A reset after the firmware update will allow the system to enter the initialization state.

Referring back to the low-power state in box 412, a low-power mode off command may be entered to have the system enter a ready state in box 416. A low-power mode 412 may again be entered from the ready state 416 if a low-power mode on command is entered.

The systems may also be configured to not support a low-power mode. Therefore, after the initialization block in box 410, the system enters into the Ready state 416. In the case of no low-power mode, a firmware update mode 414 may be entered from the ready state given a Firmware Update command.

After the ready state, a tuned mode 418 may be entered after receiving a set frequency command. That is, the receiver may provide tuning commands to the tuner so that particular programming may be provided. The tuning program may set a frequency as illustrated by arrow 420. After the tuning mode, a streaming state 422 may be entered. The streaming state 422 streams video from the external device to the host device. Once the streaming state is entered, the tuner frequency may only be changed by stopping the stream and again calling the set frequency command 420 again. Once the streaming state 422 is complete, the ready state 416 may be provided. Entering the ready state will cause the transport data in the buffers to be flushed. Streaming data may be from the currently-tuned frequency.

Figure 11:
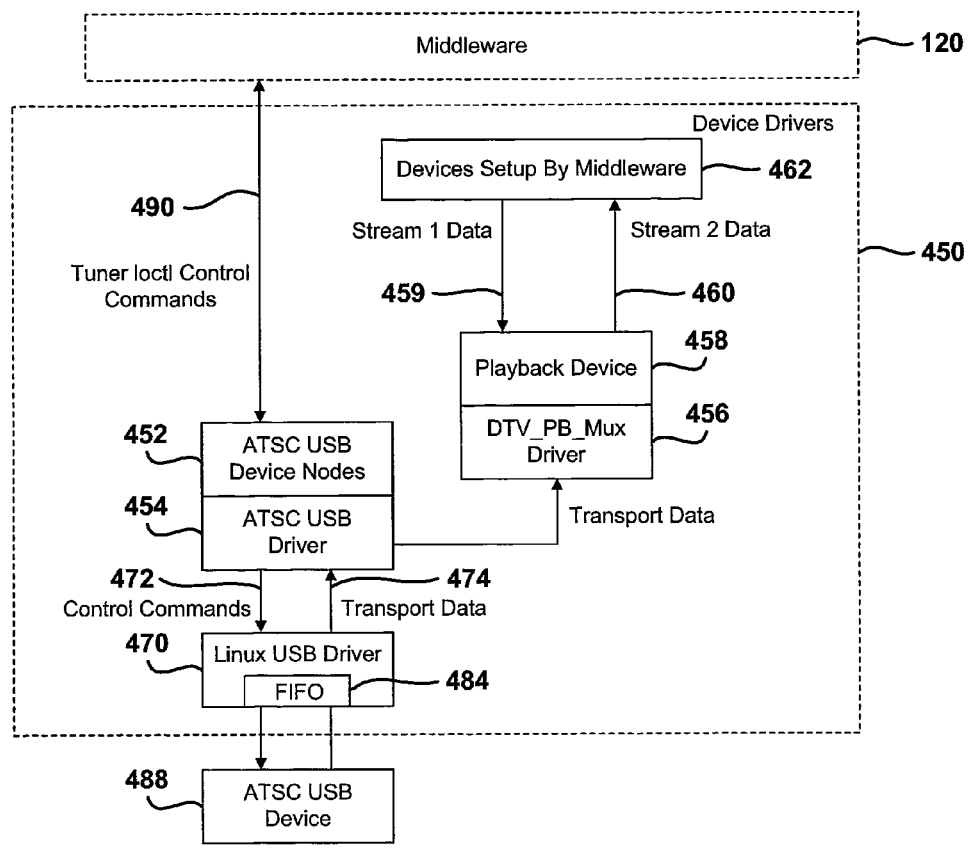
FIG. 11 is a block diagrammatic view of a portion of the controller shown coupled to the external device.

Referring now to FIG. 11, the software architecture within the controller of the receiver device or host device is illustrated. As illustrated in FIG. 2, the receiving device or host device may include middleware 120 within a controller 60. The device drivers 450 include an ATSC USB device node 452 and an ATSC USB driver 454. In this example, a tuner communicating over a USB port is provided. A multiplexer driver 456 and a playback channel or playback device 458 are in communication with the devices set up by middleware 120 through a first data stream 459 and a second data stream 460. The number of streams in this embodiment is two. However, various numbers of channels may be used. A Linux USB driver 470 may communicate control commands 472 and transport data 474 to between the Linux USB driver and the ATSC USB driver. The external device, such as the ATSC USB device 488, is in communication with the Linux USB driver which may include a first-in, first-out (FIFO) buffer 484. Tuner loctl control commands 490 may be exchanged between the middleware 120 and the ATSC USB device nodes 452.

Figure 12:
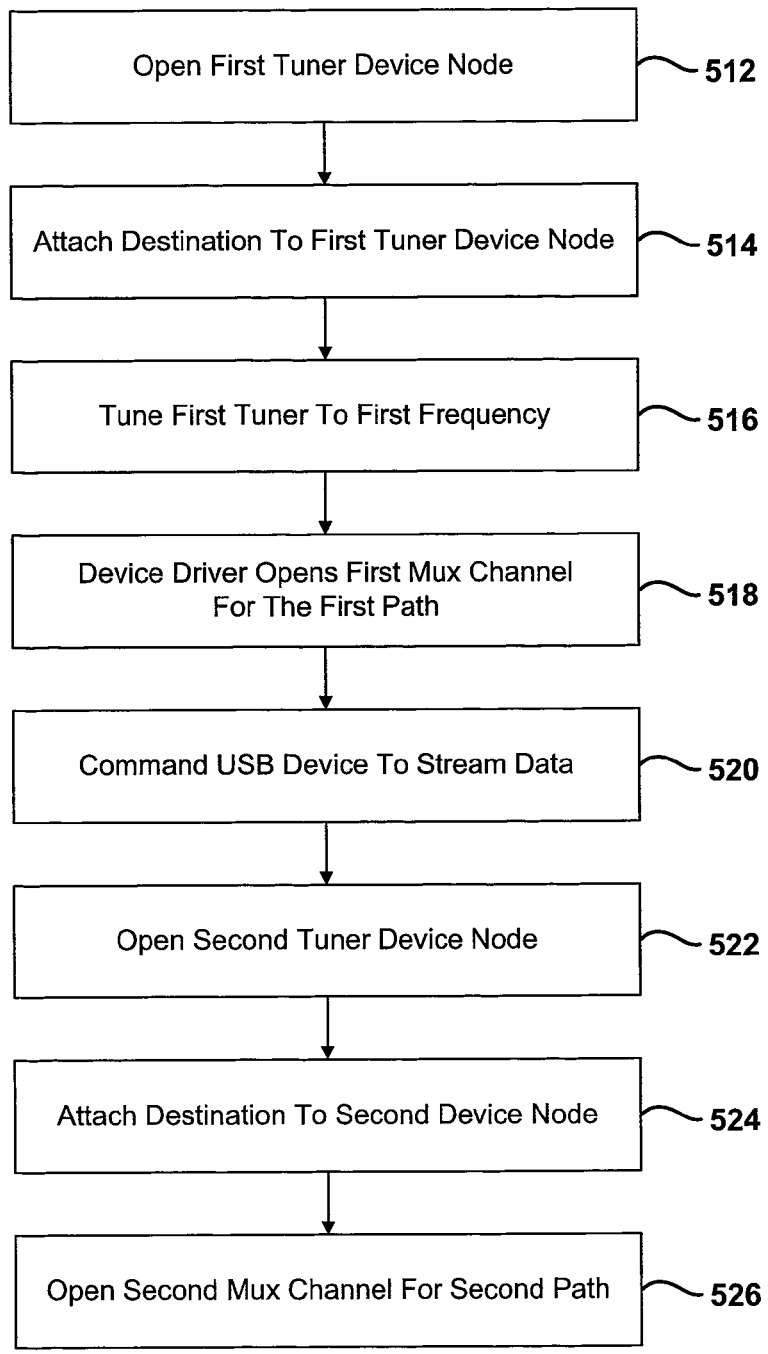
FIG. 12 is a flowchart of a method of operating the external device and a host device as illustrated in FIG. 11.

Referring now to FIGS. 11 and 12, a method for operating the block diagram illustrated in FIG. 11 is illustrated. In step 512, a first tuner device node is opened. If the receiver unit 28 includes two internal tuners and the external device includes two tuners, the tuners may be opened as device node number 3 and device node number 4. The middleware application 120 is used to translate loctl control commands to control the USB device 480. The middleware application 120 thus attaches a destination to the first tuner device node in step 514. The middleware application 120 tunes the first device node to a first frequency. The USB driver 454 opens a multiplexer channel at the multiplexer (MUX) driver 454 in step 518. The multiplexer channel may also be referred to as a virtual channel. The USB driver 454 sends a command to the USB device 480 to start streaming data in step 520. The MUX driver 456 manages the multiplexing of the data stream through the playback channel 458. The multiplexer driver 456 claims one playback device or channel for its usage. The playback device or channel selected will be unavailable for usage by any other subsystem or driver because of the different operations that will be performed on it. The multiplexer channels look to the rest of the system like an input band or tuner input. The channels also maintain configurations such as transport type, packet identifier (PID) channels that are associated with the MUX channel. When a MUX channel is used, the driver 456 will configure the physical playback device or channel to settings kept by the multiplexer channel context.

In step 522, a second device node is opened. A Transport Stream channel (TS channel) may be assigned to the second device node. This device node may be referred to as the fourth tuner. The destination "TS channel 4" may be assigned to this node in step 524. In step 526, a second multiplexer channel may be open for a second path.

When the ATSC USB driver wishes to stream data into a particular destination, commands may be sent to the multiplexer driver 456 indicating which multiplexer channel it is using, the location of data, and the length of the data. The multiplexer driver 456 may set a physical playback device or channel to the multiplexer channel context settings, enable all PID channels associated with the multiplexer channel and send data through to the destination.

Referring now to FIGS. 13A-13E, a data streaming process is illustrated. The block diagrams illustrated in FIGS. 13A-13E are simplified block diagrams from those of FIG. 11.

Figure 13A:
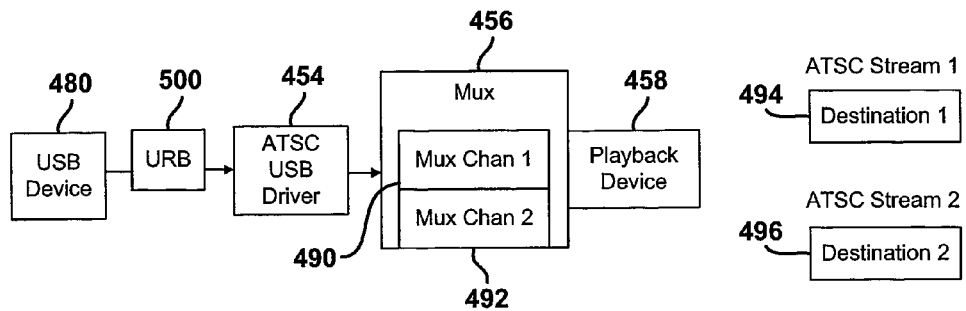
FIGS. 13A-13E are block diagrammatic views illustrating streaming data from the external device to two destinations within the host device.
Figure 13B:
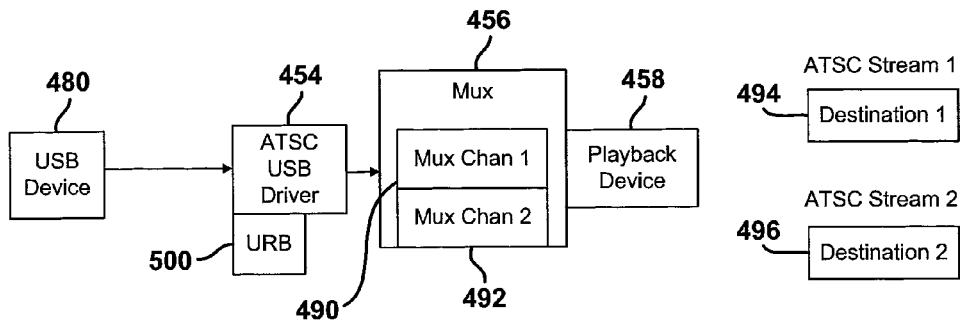
Figure 13C:
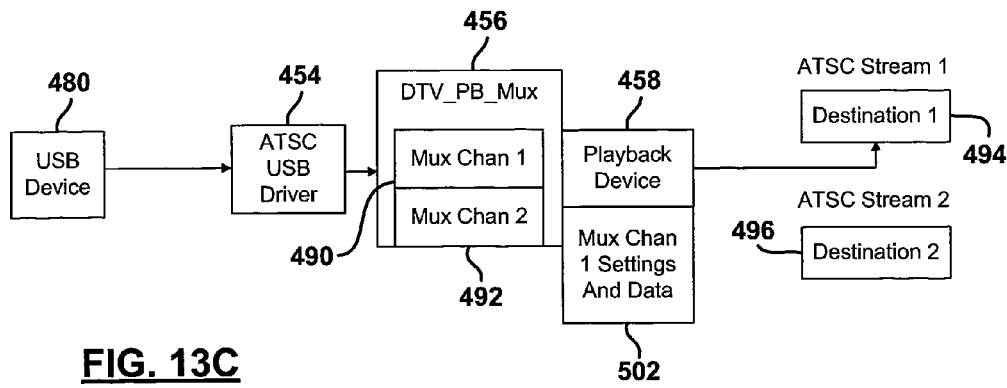
Figure 13D:
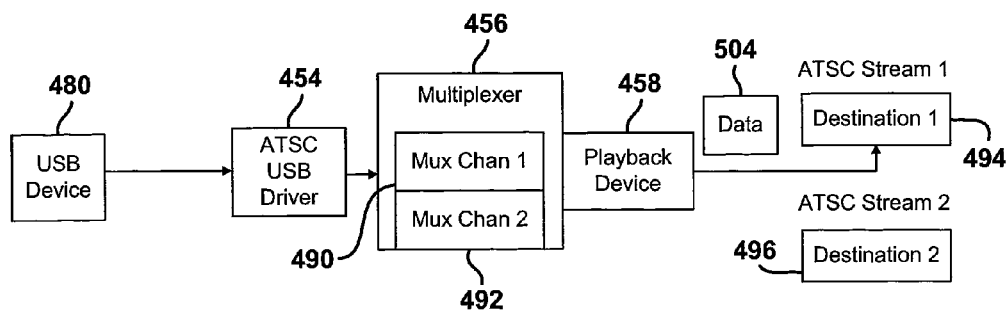
Figure 13E:
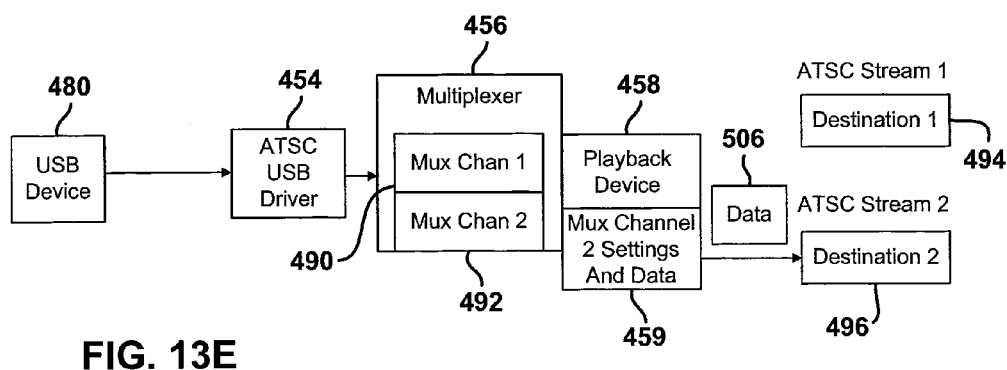
Figure 14:
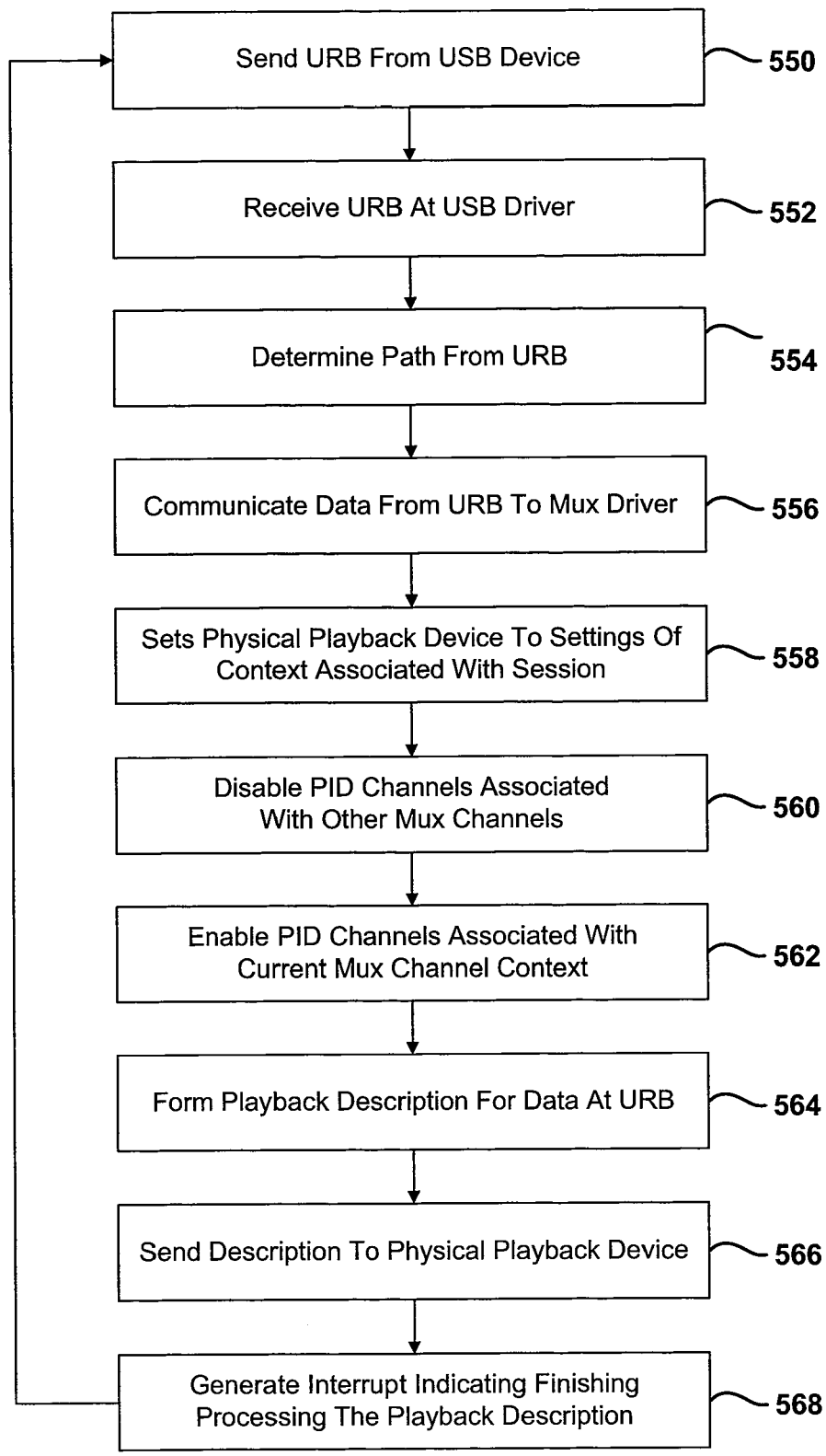
FIG. 14 is a flowchart of a method of performing the steps illustrated in FIGS. 13A-E.

Referring now also to FIGS. 13A-13E and FIG. 14, the USB device 480 sends a USB request block 500 to the ATSC USB driver 454 in step 550. In step 552, the Universal Serial Bus Request Block (URB) is received at the USB device driver as illustrated in FIG. 13B. The device driver determines that it has come from a USB interface associated to stream number 1. The driver then sends the data to the multiplexer channel 1 in the MUX driver 456. The multiplexer channels are virtual channels over a single hardware channel. The data that is communicated from the URB to the MUX driver is performed in step 556. In step 558, the physical playback device is set to the settings of the context associated with stream number 1. This is illustrated in FIG. 13C by block 502. In step 560, the packet identifier channels associated with other MUX channels are disabled and in step 562 the packet identifier channels associated with the current multiplexer channel are enabled. The MUX driver 456 creates a playback descriptor for the data 504 in step 564. The playback descriptor is passed to the playback device. The playback device then sends the data 504 to destination 1 494. Destination 1 represents all downstream devices of the playback parts which have been configured by the middleware application for ATSC stream number 1. Step 566 sends the descriptor to the physical playback device and step 568 generates an interrupt indicating finishing processing of the playback descriptor. Operation for a subsequent URB for the ATSC stream 2 and ultimately the destination 2 (reference number 496) will proceed in the same fashion except that the driver will determine that the URB has come from the USB interface associated with ATSC stream 2. The configuration (settings and data) of the second multiplexer channel is performed in block 459. The data will be sent to the virtual or multiplexer channel 2 and the multiplexer driver 456 will configure the physical playback device to have multiplexer settings associated to the stream number 2. Again, the PIDs associated with multiplexer channel 2 will be enabled and all others disabled. A descriptor for the data will be created and sent to the physical playback device which will then send the data to destination 2 which corresponds to box 496. Switching will continue as long as data from both ATSC streams is provided.

Figure 15:
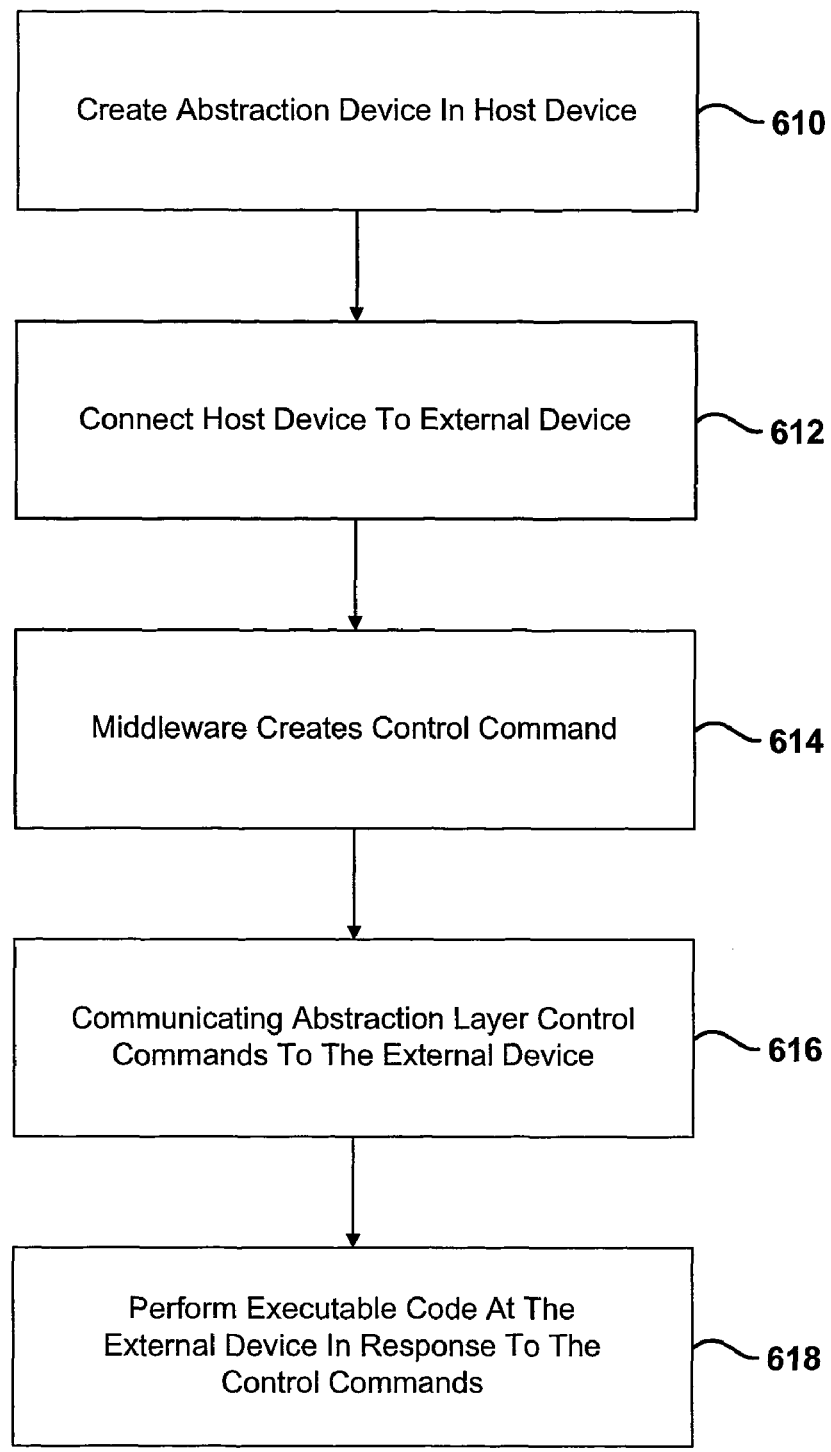
FIG. 15 is a flowchart of a method of abstracting the external device from the host device.

Referring now to FIG. 15, a method for performing abstraction of the attached external device is illustrated. The ATSC external device may incorporate high-level communication protocol which allows for abstraction of the underlying hardware from the USB host device 28. Thus, the set top box or host device does not have to have an intimate knowledge of the underlying workings of the tuner. The external device is dynamically assigned to an internal abstracted device connection. For example, the USB host will not need to know the I2C address of the tuner and demodulator. Also, the host will not need to know how to toggle each component's registers to tune to various frequencies, enable demodulation modes and which registers to read to determine the demodulator lock. Thus, a unique driver 454 illustrated in FIG. 11 is provided for the different type of device but not for the particular model and brand of the device. The Ioctl control commands are translated by the device to driver 454 for communication to the USB device. Thus, the ATSC USB driver 454 creates an abstraction in the host device in step 610. The host device is then coupled to the external device in step 612. The middleware creates Ioctl control command in step 614. In step 616, the abstraction layer generates translated control to commands to the external USB device 480. Examples of control commands include such commands as "tune to frequency X" or "read capabilities." Through such high-level commands, the details of retrieving the information are abstracted. Such abstraction is useful when hardware enhancements such as advanced modulators or additional components such as PID filters are available. Hardware changes may be abstracted out as the communication protocol still can be implemented and the receivers obtain the desired results when issuing the communication commands.

Figure 16:
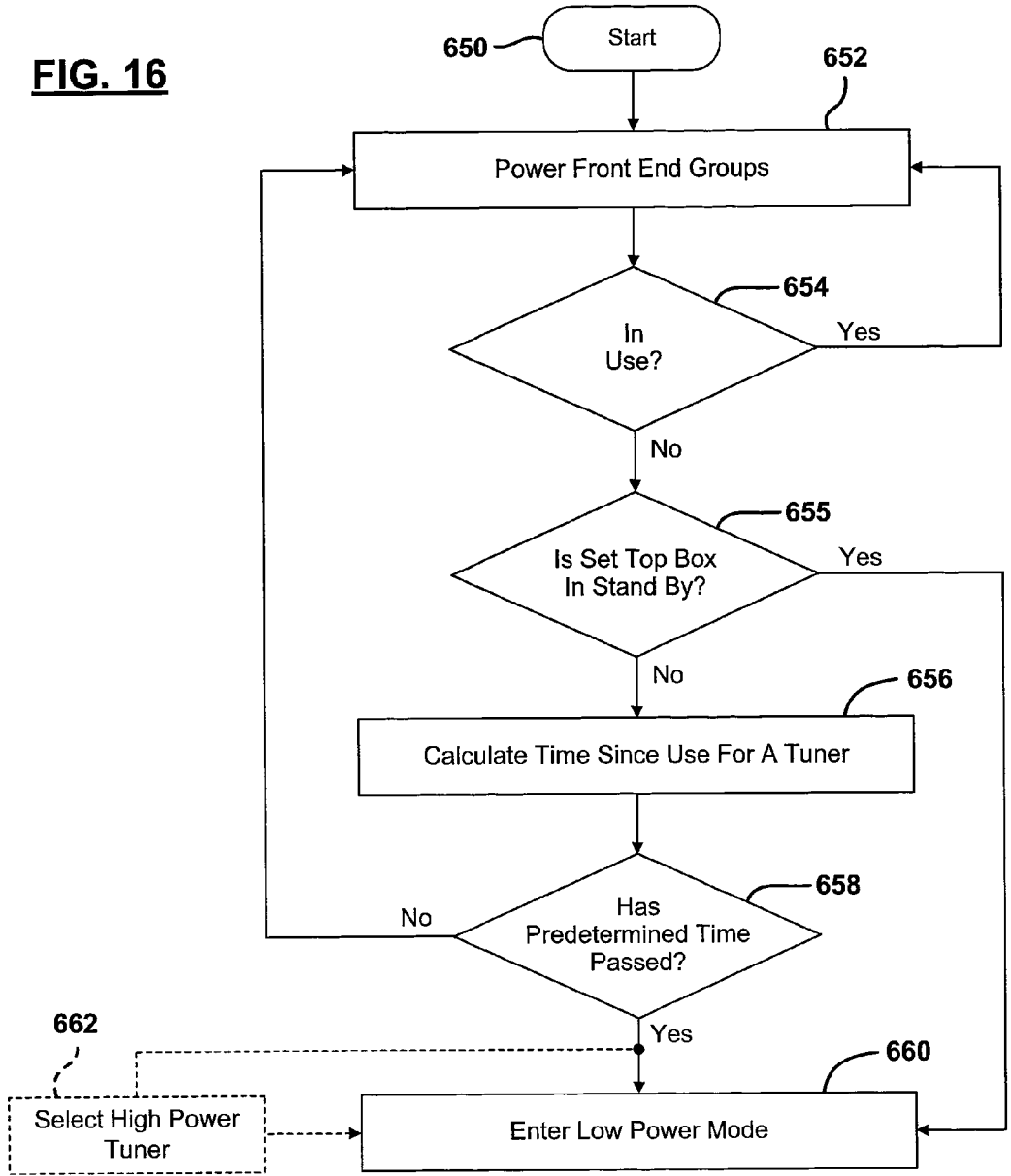
FIG. 16 is a flowchart of methods of entering a tuner into low power mode.

Referring now to FIG. 16, as mentioned above, the external tuner devices may have a low-power mode. The tuner and demodulator may be referred to as a front-end group. The entire front-end group for each stream may be independently controlled into a low-power mode. The front-end group may include the demodulator and tuner. In step 650, the system is started. That is, at this point, the external tuners are in communication with the receiving device or host device. The front-end groups are thus powered in step 652. In step 654, it is determined whether or not the tuners are in use. If the tuners are in use, step 652 continues to power the front-end groups. In step 654, if the tuners are not in use, step 655 determines if the front end group is in standby mode. If the front end group is not in standby mode, step 656 calculates the time since the use for a tuner. In step 658, if a predetermined time has not passed, step 656 is again repeated. In step 658, if a predetermined time has passed, a low-power mode is entered in step 660. In step 655, if the front end group is in standby mode, step 660 is performed and a lower power mode is entered.

An optional step may also be provided in step 662 that selects a high-power tuner to enter a low-power mode. The tuners may have different power capacities and, thus, a lower-power tuner is powered while a higher-power tuner may be selected to enter the low-power mode versus a lower-power tuner. Shifting tuning to a lower power tuner may also occur. The duties of a higher power tuner may be shifted to a tuner that uses less power. This may occur for multiple tuners based upon usage. It should also be noted that, should the external device be an HD tuner or a complimentary tuner to those inside the receiving device, the tuner with the lower power may be selected to enter the low-power state. Of course, the compatibility to time to the type of signal (e.g., ATSC vs. satellite) will be taken into consideration. Thus, if the attached or external device tuners use lower power than the internal receiver devices due to some technological advance, the external tuners may be powered while the internal tuners may be placed in a low-power mode.

Figure 17:
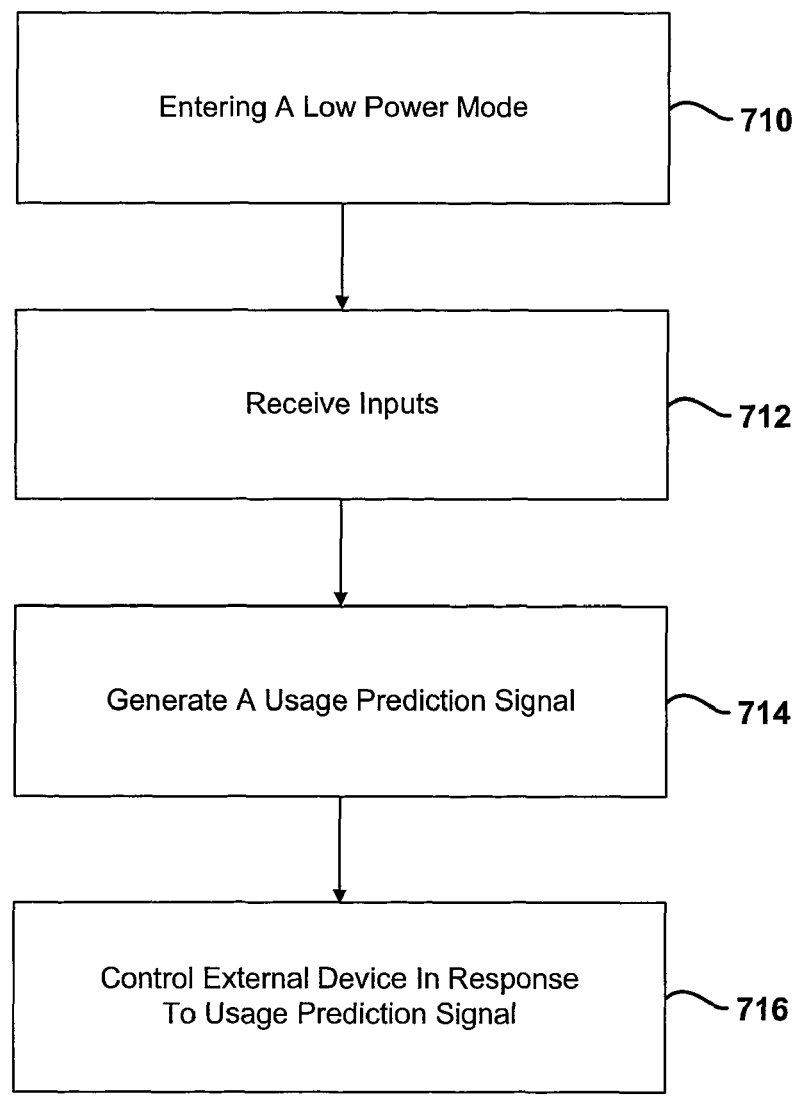
FIG. 17 is a flowchart of a method of removing a tuner in low power mode.

Referring now to FIG. 17, a low-power mode may be advantageous as described above in FIG. 16. However, once a device is in low-power mode, an amount of time is needed to bring the electronic out of the low-power mode. Thus, the consumer may see a longer channel change time if a tuner is not taken out of low-power mode sooner. In the following method set forth in FIG. 7, a prediction signal may be generated to predict when to take a tuner out of low-power mode so that the user does not experience a delay in changing channels. In step 710, various inputs may be received. As will be described below, a prediction signal may be formed using various inputs or changes in the tuner device or the receiving device. Inputs may include the remote-control input that allows the receiving device to determine the user is scrolling through the guide through the range of channels that will use the tuner in the low-power mode and, thus, it is likely that a tuner may be needed. Other tuner inputs include monitoring the dash key which indicates the user is likely to tune to an ATSC sub-channel. For example, when tuning to a channel such as 4-1, when the "-" key is pressed, the signal at the tuner will be generated. Usage patterns may also be the received inputs in step 712. For example, if the set top box is never interacted with between 2:00 a.m. and 5:00 a.m., the device may be safely put into a low-power mode. On the other hand, if the device is always used at a particular time or particular time of day, then the inputs are usage patterns that allow the device to be taken out of low-power mode in anticipation of use. Scheduled recordings may also be monitored so that a tuner may be taken out of low-power mode before the anticipated recording time.

In step 714, a usage prediction signal is generated. As mentioned above, the usage prediction signal may be based upon the inputs received in step 712. In step 716, an external device is controlled in response to the usage prediction signal. The external device may be a tuner which is taken out of low-power mode in anticipation of use.

It should be noted that the most efficient device may be taken out of low-power mode prior to higher-power devices. This allows the whole system to use less power.

Figure 18:
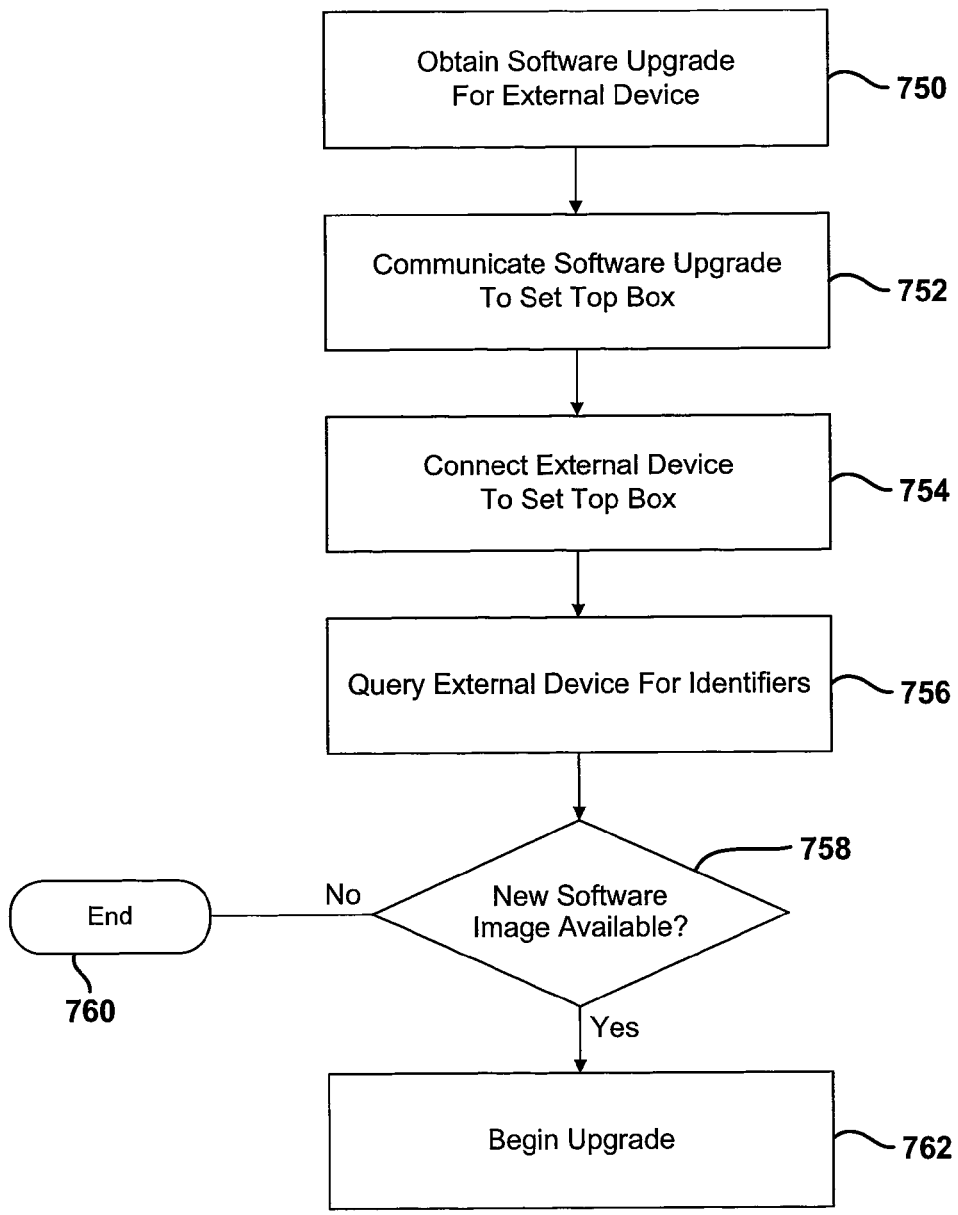
FIG. 18 is a flowchart of a method of upgrading an external device with software.

Referring now to FIG. 18, a method for upgrading the software of an external device is illustrated. The external device has the capability for upgrading its firmware in the field through a variety of distribution methods. Distribution may be performed in several manners, including satellite broadcast, wired network communication, wireless network communication, or a combination. In step 750, the software upgrade is obtained for the external device. The upgrade may be obtained at the set top box or at a computer that may be used for independently upgrading the external device. In the present example, the set top box is used. In step 752, the software upgrade is communicated to the set top box. In step 754, the external device is coupled or connected to the set top box. In step 756, a query is performed for the external device identifiers. If a new software image is not available, step 760 ends. In step 758, if the software image is available, updates are begun in step 762.

It should be noted that the identifiers in step 756 may be used to identify the make and model in different manufacturers of the tuner device. Preferably, the manufacturers implement the same communication protocol, since the abstraction above obscures the actual communication. The software images may be provided to the set top box on a regular basis or on a revolving basis in a similar manner to the program guide. When an external device is coupled to the set top box, the software upgrade may be provided automatically. The upgrade may be stored in RAM or other persistent memory of the set top box and communicated to the external device when needed. Rules may be developed for upgrading under predetermined conditions such as subscriptions or the like. Downgrades based on conditions may also be forced. Different versions may be automatically upgraded if older versions exist.

Figure 19:
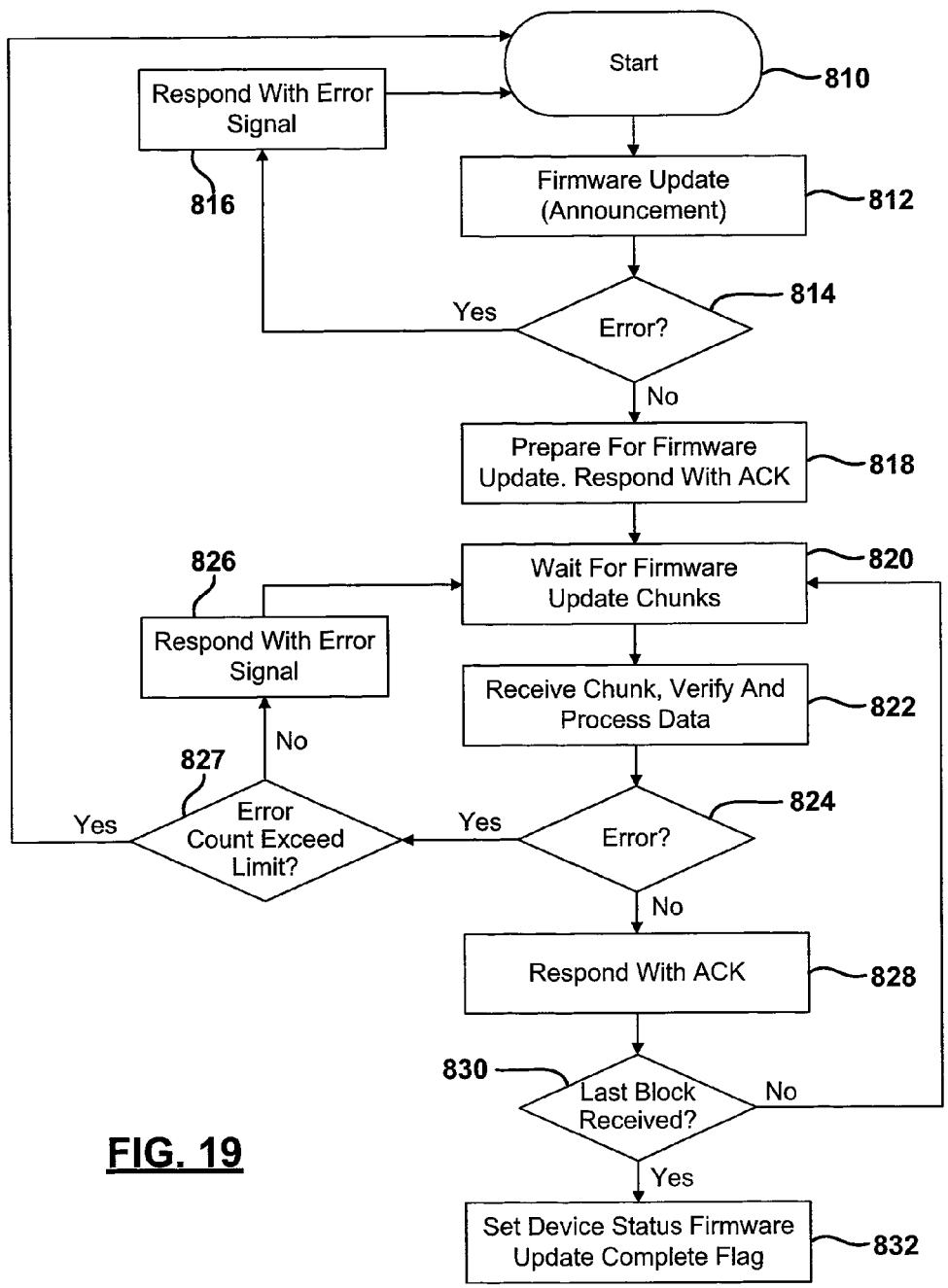
FIG. 19 is a flowchart of a method of communicating a software upgrade from the host device to the external device.

Referring now to FIG. 19, a method for updating the firmware is illustrated. In step 810, the system starts. A firmware update announcement is generated in step 812. After step 812, if an error occurs in the announcement in step 814, the system responds with an error signal in step 816 and again performs the start function in step 810. If no error is present in the announcement in step 814, the external device is prepared for a firmware update and sends an acknowledge signal. In step 820, the firmware update is provided in chunks. A chunk is then verified in step 822 once it is received. The chunk is processed and if there was an error in step 824, the number of errors is checked in step 827. If the error count is less than a limit, then the system responds with an error signal in step 826. In step 827, if the number of times through the loop exceeds the limit, then the system waits for a firmware update announcement again in step 810.

In step 824, if no error was generated, an acknowledge signal is generated in step 826. If the last block has not been received in step 830, steps 820-828 are again performed until the last block is received in step 830. In step 830, once the last block has been received, step 832 is performed. In step 832, the device status firmware update complete flag is set within the external device to provide notice that the firmware update is complete.

Figure 20:
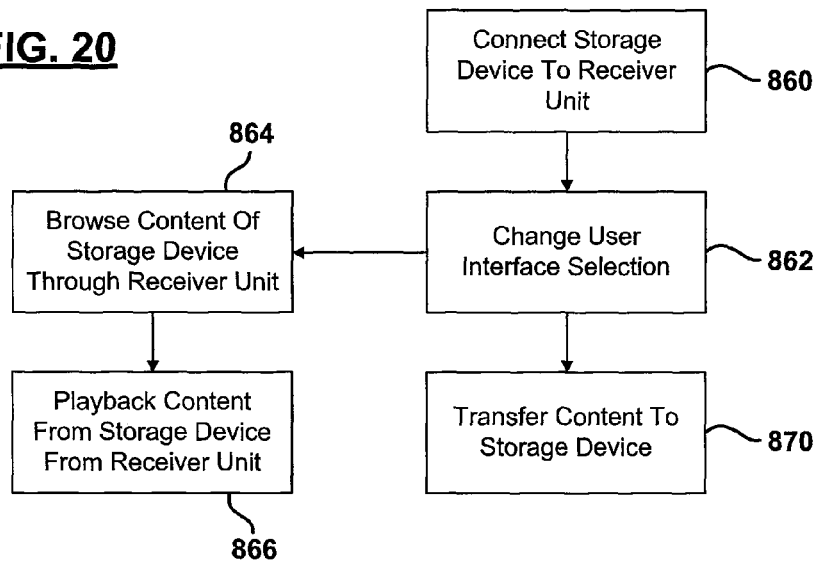
FIG. 20 is a flowchart of a method of connecting an external storage device to a host device.

Referring now to FIG. 20, the user interface of the device may be changed according to the resources added and removed to the system. As mentioned above, the tuner may be added and the channel selections may be changed in the user interface. However, other types of devices may be added which include a storage device. In step 860, a storage device is connected to the receiver unit. The storage device may be a hard drive or other type of memory or a portable storage device such as a personal portable media player.

In step 862, the user interface selection may be changed. In step 864, content of the storage device may be browsed through the receiver unit. In step 866, the content may be played back directly from the storage device through the receiver unit by selecting a selection from the user interface that has been modified in response to the coupling of the receiving device and the external device. Such a configuration allows a portable media player to store various content that may be played back on a particular display associated with a receiving device to which it is coupled.

Referring back to step 862, step 870 may also be performed thereafter that allows the content from the storage device to be transferred to the receiver unit. Thus, the user interface may be changed to allow or synch the receiving device to the external user device. Likewise, the receiver device may also communicate content to the external device.

Figure 21:
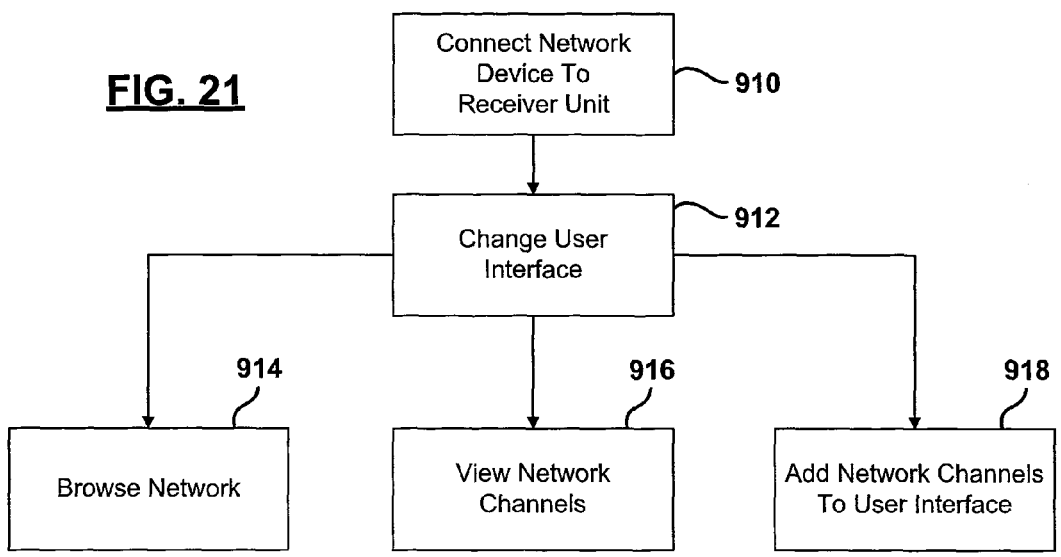
FIG. 21 is a flowchart of a method of connecting a network device to a host device.

Referring now to FIG. 21, an extension of the concept may be to attach the set top box to the Internet. Various channels may be available directly through the Internet. In step 910, a network device is connected to the receiver unit to allow the receiver unit to communicate through a network. In step 912, the user interface may be changed to accommodate the new capability of the receiver unit to connect to a network such as the Internet. The network may be browsed in step 914. Thus, after browsing, various network channels may be viewed in step 916. In step 918, network channels may be added to the user interface so that when the program guide is browsed, the network channels may also be browsed as well.

Figure 22:
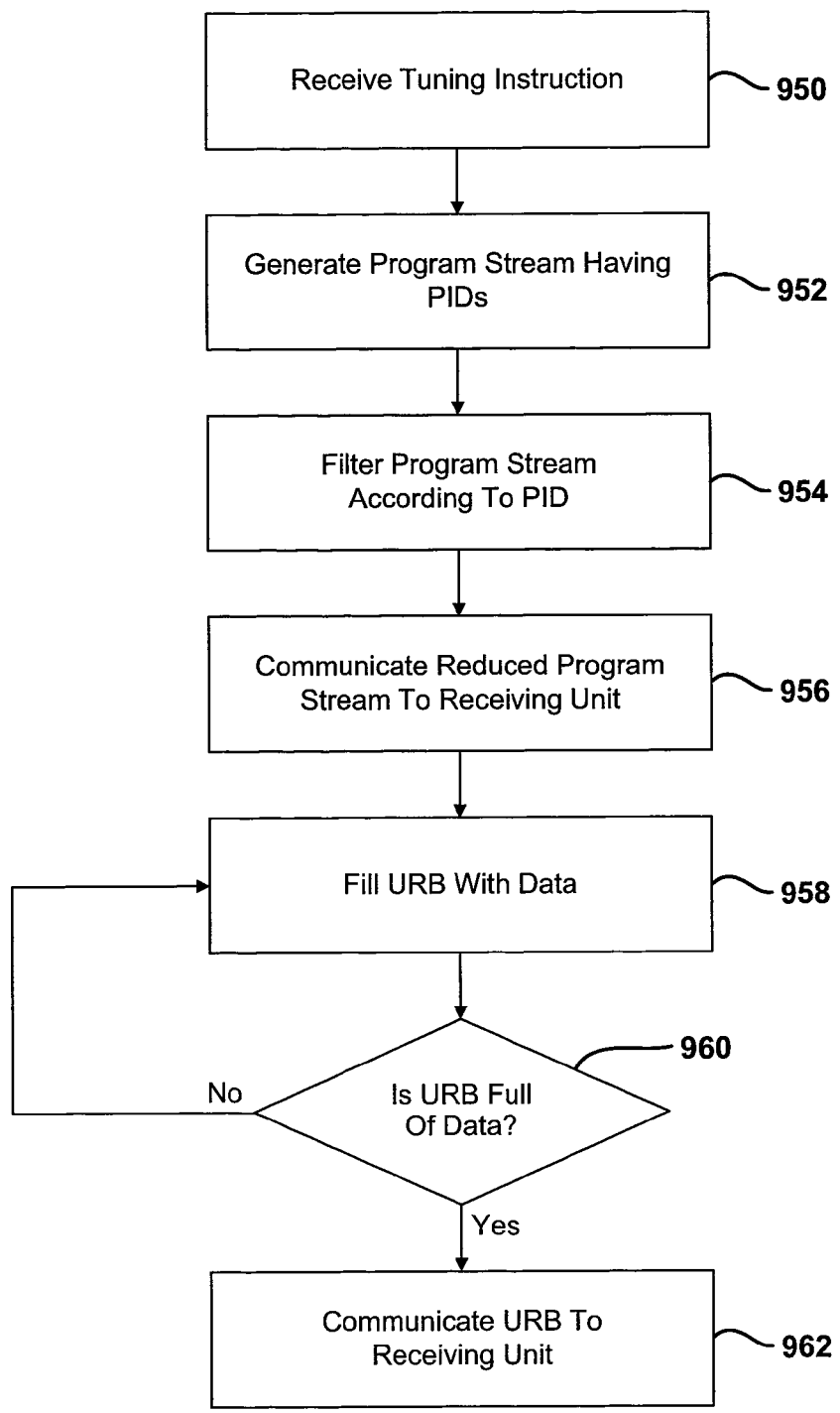
FIG. 22 is a flowchart of a method for communicating a filled URB.

Referring now to FIG. 22, the data between a tuner device and a receiving device may be shaped to optimize the connection through the receiving port. In USB tuner systems, streaming modulated data is provided for the entire transponder and, therefore, is wasteful since a host may not need the entire amount of data. Thus, processing power is unnecessarily used within the host and bandwidth on the communication medium will be wasted. In step 950, tuning instructions are received. Program streams having packet identifiers are generated in step 952. The PID streams may be filtered according to the PIDs and a reduced amount of data may be communicated through the program stream to the receiving unit in step 956. Because each packet may be tagged in the multiplex packetized stream, the PIDs may identify from which stream the packet is a member. Because the host is only interested in a fraction of the streams that the multiplex data stream carries, the PID filters may be placed on the external USB device to remove the undesired streams. The PID filters are illustrated as blocks 214 and 214' in FIG. 3. In addition to or instead of steps 950-956, the USB request blocks (URBs) may be provided only when they are filled from the external device to the host device. The URBs are time windows where the USB device has an opportunity to put data on the wire. Often times in a USB device a window is not fully utilized and, thus, a request block or "bucket" is only partially filled and sent. Partially-filled request blocks require additional processing at the host and holes are filled with special values that must be ignored by downstream systems. Processing empty holes is processor-intensive since each bucket needs to be examined. In step 958, this problem is alleviated by filling the URB completely with data. When the requested block is not filled with data, step 958 is again performed to ensure that the bucket is filled with data. In step 958, when the URB is full of data, step 962 is performed. Step 962 communicates the URB to the receiving unit. Thus, only filled buckets or request blocks are sent, and empty buckets or request blocks are not sent.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    directly connecting an external television tuner to a television signal receiving unit having an internal television tuner;
    entering a low power mode at the external television tuner;
    generating a prediction signal in response to inputs to the television signal receiving unit; and
    removing one of the external television tuner and internal television tuner from low power mode in response to the prediction signal.

2. A method as recited in claim 1 wherein generating a prediction signal comprises generating a prediction signal from a remote control input.

3. A method as recited in claim 1 wherein generating a prediction signal comprises generating a prediction signal from a usage pattern.

4. A method as recited in claim 1 wherein generating a prediction signal comprises generating a prediction signal from a scheduled recording time.

5. A method as recited in claim 1 wherein directly connecting the external television tuner to a receiving unit comprises coupling the external television tuner to a satellite television signal receiving device.

6. A method as recited in claim 1 wherein the external television tuner comprises a first television tuner and a second television tuner and wherein removing one of the external television tuner and the internal television tuner from low power mode in response to the prediction signal comprises removing a lowest power device of the first television tuner or the second television tuner from low power mode in response to the prediction signal.

7. A method as recited in claim 1 wherein removing one of the external television tuner or internal television tuner from low power mode in response to the prediction signal comprises removing a lowest power device of the external television tuner or the internal television tuner from low power mode in response to the prediction signal.

8. A method as recited in claim 1 wherein coupling an external television tuner to a receiving unit comprises coupling the external television tuner having a first external television tuner and a second external television tuner to the receiving unit having a first television receiving tuner and a second television receiving tuner and wherein removing one of the external television tuner or internal television tuner from low power mode in response to the prediction signal comprises removing a lowest power device of the first external television tuner, the second external television tuner, the first receiving television tuner or the second receiving television tuner from low power mode in response to the prediction signal.

9. A method as recited in claim 1 wherein directly connecting an external television tuner to a receiving unit comprises coupling the external television tuner to the receiving unit through a universal serial bus connector.

10. A method as recited in claim 1 wherein directly connecting an external television tuner to a receiving unit comprises coupling the external television tuner to the receiving unit through a wireless connector.

11. A method as recited in claim 1 wherein directly connecting an external television tuner to a television signal receiving unit comprises coupling the external television tuner to the television signal receiving unit through a wired connector.

12. A system comprising:
    A television signal receiving unit having an internal television tuner; and
    an external television tuner directly connected to the television signal receiving unit, said external television tuner in a low power mode;
    said television signal receiving unit comprising a controller generating a prediction signal in response to an input to the television signal receiving unit and commanding one of the external television tuner and internal television tuner from low power mode in response to the prediction signal.

13. A system as recited in claim 12 wherein the input comprises a remote control input.

14. A system as recited in claim 12 wherein the input comprises a usage pattern.

15. A system as recited in claim 12 wherein the input comprises a scheduled recording time.

16. A system as recited in claim 12 wherein the receiving unit comprises a satellite television receiving device.

17. A system as recited in claim 12 wherein the external television tuner comprises a first television tuner and a second television tuner and wherein the controller controls the external television tuner from low power mode by removing a lowest power device of the first television tuner or the second television tuner from low power mode in response to the prediction signal.

18. A system as recited in claim 12 wherein the external television tuner comprises a first external television tuner and a second external television tuner and the television signal receiving unit comprises a first television receiving tuner and a second television receiving tuner and wherein the television signal receiving unit controls the first external television tuner, second external television tuner, a first receiving television tuner and a second receiving television tuner from low power mode by removing a lowest power device comprising one of the first external television tuner, second external television tuner, a first receiving television tuner and a second receiving television tuner from low power mode in response to the prediction signal.

19. A system as recited in claim 12 wherein the television signal receiving unit is in communication with the external television tuner through a universal serial bus.

20. A system as recited in claim 12 wherein the television signal receiving unit is in communication with the external television tuner through a wired connection.

21. A system as recited in claim 12 wherein the television signal receiving unit is in communication with the external television tuner through a wireless connection.

* * * * *